(12) United States Patent
Jain et al.

(10) Patent No.: US 11,789,922 B1
(45) Date of Patent: Oct. 17, 2023

(54) ADMITTING FOR PERFORMANCE ORDERED OPERATIONS OF ATOMIC TRANSACTIONS ACROSS A DISTRIBUTED DATABASE

(71) Applicant: Amazon Technologies, Inc., Seattle, WA (US)

(72) Inventors: Rishabh Jain, Seattle, WA (US); Akhilesh Mritunjai, Seattle, WA (US); Vaibhav Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 499 days.

(21) Appl. No.: 16/714,531

(22) Filed: Dec. 13, 2019

(51) Int. Cl.
*G06F 16/23* (2019.01)
*G06F 16/27* (2019.01)
*G06F 3/06* (2006.01)
*G06F 9/46* (2006.01)

(52) U.S. Cl.
CPC .......... *G06F 16/2322* (2019.01); *G06F 3/0604* (2013.01); *G06F 3/0659* (2013.01); *G06F 3/067* (2013.01); *G06F 9/466* (2013.01); *G06F 16/27* (2019.01)

(58) Field of Classification Search
None
See application file for complete search history.

(56) References Cited

U.S. PATENT DOCUMENTS

| 10,467,694 | B2 | 11/2019 | Katsuyama et al. | |
|---|---|---|---|---|
| 2011/0196882 | A1* | 8/2011 | Kesselman | G06F 16/27 707/753 |
| 2015/0101024 | A1* | 4/2015 | Leggette et al. | H04L 67/1001 726/4 |
| 2016/0299693 | A1* | 10/2016 | Sakdeo et al. | G06F 3/0673 |
| 2017/0123700 | A1* | 5/2017 | Sinha et al. | G06F 12/0253 |
| 2017/0123947 | A1* | 5/2017 | Baptist et al. | H04L 43/0864 |
| 2017/0192693 | A1* | 7/2017 | Gupta et al. | G06F 3/065 |
| 2018/0246923 | A1* | 8/2018 | Carman et al. | G06F 9/466 |

(Continued)

FOREIGN PATENT DOCUMENTS

WO 2018170276 A2 9/2018

OTHER PUBLICATIONS

Rachel Harding, et al., "An Evaluation of Distributed Concurrency Control", Proceeding of the VLDB Endowment, Vol. 10, No. 5, 2017, Pages 553-564.
U.S. Appl. No. 16/014,890, Filed Jun. 21, 2018, Douglas Brian Terry et al.

(Continued)

*Primary Examiner* — Alford W Kindred
*Assistant Examiner* — Cao D Vuong
(74) *Attorney, Agent, or Firm* — S. Scott Foster; Kowert, Hood, Munyon, Rankin & Goetzel, P.C.

(57) ABSTRACT

Various embodiments are described regarding admitting for performance ordered operations of atomic transactions across a distributed database. In some embodiments, a node of a distributed system receives and accumulates requests for operations over a period of time. The node can then order the requests based on certain criteria, such as by timestamps of associated transactions. The node can then perform an admission control on the ordered requests, until a capacity of the node to perform the requests for operations is exceeded. During the admission control process, those requests for operations received within the period of time that are not admitted can be rejected by the node.

20 Claims, 14 Drawing Sheets

(56) References Cited

U.S. PATENT DOCUMENTS

| | | | |
|---|---|---|---|
| 2019/0155795 A1* | 5/2019 | Xiao | G06F 9/52 |
| 2019/0361883 A1 | 11/2019 | Weaver et al. | |
| 2019/0361895 A1 | 11/2019 | Weaver et al. | |
| 2020/0125664 A1* | 4/2020 | Tiwary | G06F 16/951 |
| 2020/0348863 A1* | 11/2020 | Venkatesan et al. | G06F 9/5011 |
| 2021/0042322 A1* | 2/2021 | Mohammad et al. | G06F 9/461 |
| 2021/0109949 A1* | 4/2021 | Zbarsky et al. | G06F 16/27 |
| 2021/0165768 A1* | 6/2021 | D'Halluin et al. | G06F 16/1734 |

OTHER PUBLICATIONS

U.S. Appl. No. 16/364,025, Filed Mar. 25, 2019, Akshat Vig et al.
U.S. Appl. No. 16/364,036, Filed Mar. 25, 2019, Rishabh Jain et al.

\* cited by examiner

Receive, at a node of a distributed system, different requests for operations to be performed as part of different transactions to be performed at multiple nodes of the distributed system, where the different requests for operations are received within a period of time
610

Admit some of the different requests for operations received within the period of time for performance at the one node, according to an order for performing the transactions at the distributed system, until a capacity of the one node to perform the requests for operations is exceeded
620

Reject the remainder of the different requests for operations received within the period of time that are not admitted by the one node
630

FIG. 6

ADMITTING FOR PERFORMANCE ORDERED OPERATIONS OF ATOMIC TRANSACTIONS ACROSS A DISTRIBUTED DATABASE

BACKGROUND

Different database systems offer different features for performing operations with respect to data in the database system. In some scenarios, some features may provide some functionality at the cost of other capabilities or performance. For example, transactions offered as a feature of a database, including a NoSQL database, may provide for or facilitate the construction of correct and reliable applications that wish to maintain multi-item invariants. Thus, highly performant techniques for implementing this transaction feature may be desirable.

In a distributed database, transactions can span multiple partitions. Each node hosting those partitions has a hardware limit of executing only so many IOs per second ("IOPS"). In a high request rate workflow, different transactions can compete for the IOPS capacity on the same partition. This can lead to IOPS starvation, and the transactions might then be aborted across the different relevant partitions. However, even if a transaction aborts, the prepare phase still consumes IOPS on the relevant individual partitions. Often, competing transactions may not make any progress at all, while also still consuming IOPS resources across the multiple relevant partitions of the table. This can cause a live-lock situation.

BRIEF DESCRIPTION OF THE DRAWINGS

FIG. 6 is a high-level flowchart illustrating various methods and techniques to implement admitting for performance ordered operations of atomic transactions across a distributed database, according to some embodiments.

Figure 1:
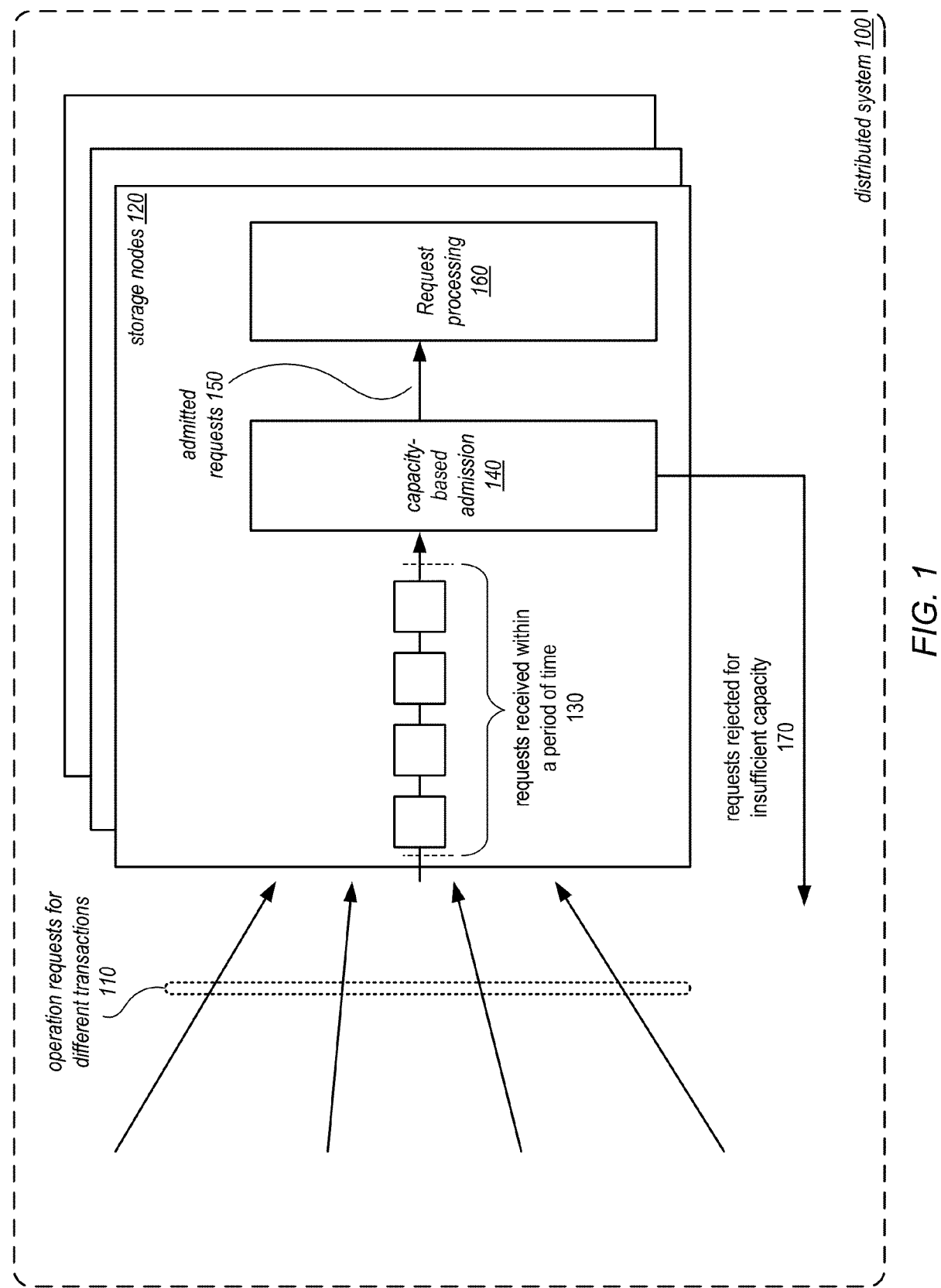
FIG. 1 is a logical block diagram illustrating admitting for performance ordered operations of atomic transactions across a distributed database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement admitting for performance ordered operations of atomic transactions across a distributed database, according to some embodiments. Distributed database systems can offer many performance advantages to users, in various embodiments. By distributing the data and work to access the data amongst multiple storage locations, a distributed database system can offer scalable, available, and highly performant storage, in some embodiments. To support transactions in addition to requests for individual items, distributed database systems may order the performance of requests, including transaction operations in order to ensure that Atomicity Consistency Isolation and Durability (ACID) principles are satisfied in order to ensure that transactions are perceived as a single logical operation in the distributed database, in various embodiments. Admitting for performance ordered operations of atomic transactions across a distributed database, as discussed below, may reduce work and inter-system traffic between nodes of a distributed database system in order to perform ACID compliant transactions, and thus may improve the performance of a distributed database system, in various embodiments.

In a distributed database, transactions can span multiple partitions. Each node hosting those partitions has a hardware limit of executing only so many IOs per second ("IOPS"). In a high request rate workflow, different transactions can compete for the IOPS capacity of a node on the same partition. This can lead to IOPS starvation, in some embodiments, and the transactions might then be aborted across the different relevant partitions. However, even if a transaction aborts, the prepare phase still consumes IOPS on the relevant individual partitions, in some embodiments. Often, competing transactions may not make any progress at all, while also still consuming IOPS resources across the multiple relevant partitions of the table. This can cause a live-lock situation.

Admitting for performance ordered operations of atomic transactions across a distributed database trades off head latency, in some embodiments, for higher throughput. In some traditional systems, an admission decision is made as soon as a request is received by an executor on a partition. Contrary to these traditional systems, however, some embodiments of the current invention put bounded queue before the executor. In some embodiments, after a period of time, or when the queue is full, or when the queue has reached some limit or marker, depending on the embodiment, the executor will sort the queue by transaction timestamp and then perform the admission control. In the embodiments that wait for a period of time, the executor might sort the queue every 5 ms, in some embodiments. In some embodiments, the executor might sort the queue when the period expires, or when the queue has reached its limit, whichever happens first. Other embodiments will sort the queue at different times or based on different conditions. In some embodiments, the queue might be a FIFO queue. In other embodiments information regarding the requests might be stored in another kind of data structure, such as a hash table, linked list, stack, array, table, or any other data structure that can store entries. In this specification, a queue data structure can be substituted with other data structures, such as those mentioned above, to achieve the same functionality, and any mention of queue should not be construed as limiting. During the admission control process, the requests that don't get accepted by admission control can be rejected in the timestamp order, depending on the embodiment. In some embodiments, this admission control procedure will affect the request items across multiple partitions in the transaction timestamp order, reducing the overall contention for IOPS, and thus reducing IOPS starvation.

A problem that might be encountered in a distributed database, such as a NoSQL distributed database, can be more fully explained with the following example. In this example, a database service may implement request routing nodes and transaction coordinator nodes. The request routing nodes may receive, authenticate, parse, throttle and/or dispatch transaction requests or other access requests, among other things, in these embodiments. In these embodiments, a request router might receive a transaction request. The request router might forward the transaction request to the transaction coordinator node, in these embodiments. The transaction request may be submitted, routed, or dispatched to the transaction coordinator node, which then can interact with storage nodes to perform the requested transactions, in these embodiments. Other embodiments might have only a request router, or only a transaction coordinator node, or might include other kinds of nodes to coordinate and/or process transactions.

In this example, the request is a two-item transaction, which would require, in this case, two items to be written for the transaction to be completed. These two items might exist on two separate partitions on two separate hosts, in this example. In some embodiments, executing a transaction requires a two-phase protocol. The first phase can be a "prepare" phase, and the second phase can be a "commit" phase, in these embodiments. After the transaction coordinator node receives a request to perform a transaction, it then then, in turn, communicates with the appropriate storage nodes to inform them to prepare the transaction, in some of these embodiments. In this two-item transaction example, the transaction coordinator node can inform the two storage nodes on which the two items exist to prepare an item transaction. In this "prepare" phase, the two storage nodes that comprise the two items might lock their two respective items. This can be accomplished, in some embodiments, by writing a unique ID in a certain location on the item in the storage layer. The lock might be performed in such a way that only this transaction can unlock this item, in some embodiments. In the embodiments where a unique ID is written to the item, this is accomplished because only this transaction has access to this unique ID. At the end of the commit phase, in these embodiments, the two items would then be unlocked by their two respective storage nodes.

In addition, during the prepare phase, the storage node, or an executor associated with the storage node, determines whether there is capacity for the partition to execute the transaction, in some embodiments. Therefore, in the two-item transaction example, both storage nodes (or both executors) would determine whether there is capacity on their respective partitions to write their associated item. In addition, both storage nodes (or both executors) would lock their associated items.

The protocol might require, in some embodiments, that each storage node involved in the transaction respond to the transaction coordinator node with a message to either accept or reject the transaction. Only if each relevant storage node has informed the transaction coordinator node to accept the transaction, will the transaction coordinator node, then, in turn, respond to each storage node with a communication to perform the item transaction. In the two-item transaction example, therefore, the two storage nodes might lock their associated items, and then inform the transaction coordinator node that they accept the transaction. Once the transaction coordinator node receives these accept messages, then the transaction coordinator node can respond with a message to perform the item transaction to both storage nodes.

Therefore, between the "prepare" phase and the "commit" phase, there might be a gap of a number of milliseconds, in some embodiments. During this gap, however, more customer requests might be received by the relevant storage node, and they might consume any IOPS that are remaining on the associated host. In the two-item transaction example, one or both of the storage nodes might receive additional customer requests during this gap between the relevant transaction's "prepare" and "commit" phases, and these might consume the remaining capacity of the storage nodes. Therefore, the commit phase might not occur, in some embodiments. Since the items have been locked by the appropriate storage nodes, then a "live-lock" situation might occur, in these embodiments, where the items were locked in the prepare phase, but there is no capacity for the commit phase to be executed. In the two-item transaction example, one or both of the storage nodes associated with one or both of the items might not have capacity to commit the transaction, and their associated items might remain locked.

In various embodiments, there can be various solutions to such a problem. One solution can be to bypass some or all of the capacity checks, such as checks for IOPS, during the commit phase. In the two-item transaction example, the two items might be committed at their associated storage node, whether or not a customer or client associated with the two items has any IOPS capacity remaining. Regardless of whether the customer or client has IOPS remaining, the items are committed, in these embodiments.

Another solution can be to roll back the entire transaction, in some embodiments. This rollback can occur at the prepare phase, in some embodiments, if one or more of the items cannot be prepared, and therefore a lock cannot be prepared on these one or more items. Or this rollback can occur at the commit phase, if one or more of the associated storage nodes or partitions do not have capacity to commit their associated item or items, in other embodiments. However, when a transaction is rolled-back, one or more, or even all, of the associated storage nodes still consumes capacity for this rolled-back transaction, in these embodiments. Any storage nodes that prepare an item will consume capacity at those storage nodes, in these embodiments. The storage nodes might consume 1 IO to prepare an item, and then 1 IO to roll-back the item, in some embodiments. This rollback can comprise removing the lock on the associated item, and consuming IO capacity in order to remove the lock. In the two-item transaction example, if one of the associated storage nodes cannot prepare an item, and therefore the associated transaction must be rolled-back, the other storage node still consumes IO in order to lock its associated item, and then unlock its associated item in a subsequent roll-back, in this example. Else, if one of the storage nodes do not have capacity during the commit phase, then all the associated storage nodes will have consumed IO capacity to prepare the item, lock the item, and then roll-back the item and unlock the item, in some of these embodiments.

In addition, simply and only rolling back transactions, if one of the storage nodes or partitions does not have the capacity to complete the transaction, might cause a contention between multiple transactions that would have the effect of not allowing any of the transactions to complete, in some embodiments. For example, two transaction might be received that involve items on the same two storage node or partitions. The first transaction might be able to prepare the item of the first storage node, but not on the second storage node, and it will abort. Similarly, the second transaction might be able to prepare its item on the second storage node, but not on the first storage node, and it will abort too. Thus the two transactions might cause each other to abort. As a further example, if both storage nodes only have 1 IO capacity remaining, and the first transaction consumes the 1 IO on the first storage node, and the second transaction consumes the 1 IO on the second storage node, but both transactions need to prepare items in both storage nodes, then both transactions will fail.

When a transaction is rolled-back, this causes further ramifications for other transactions or access requests. When a transaction is rolled-back, and therefore consumes IO in the associated prepare and roll-back phases, other transactions or access requests that involve those storage nodes or partitions might also fail, that would have otherwise succeeded, in some embodiments. Because the failed transaction consumes IO capacity in the prepare phase, and then the accompanying rollback, for at least some of the associated storage nodes or partitions, another transaction or access request might therefore not have the IO capacity to complete either. This can cause a cascading effect of failed transactions or access requests, as each one consumes IO capacity that in turn causes another one to fail.

In an ideal world, it would be useful for the transaction coordinator node to know whether there is available IO capacity on all the associated partitions before any of the items on any of the partitions are prepared. Therefore, even before the prepare phase is started, it would be useful to know whether or not there IO capacity on the associated storage nodes or partitions. It would be useful to only perform transactions when there is IO available on each of the associated storage nodes. It would be useful to not try to perform transactions that are going to fail, and therefore cost clients or customers IO capacity in the prepare phase, and also cost clients or customers IO capacity in any associated roll-back of the prepare phase.

Another solution to the above problems, in some embodiments, can be for the transaction coordinator node, or another node, to ask the storage nodes or partitions how much capacity they have remaining, and only going forward with the transaction if each relevant storage node or partition has the required capacity remaining. However, such a protocol might not be atomic, in some embodiments, since any communication takes time, and by the time the communication occurs, other requests might have come into the storage node or partition that might cause the capacity of the storage node or partition to be reduced, in some embodiments. Therefore, a pattern of rejected transactions consuming IO, and a cascading effect of failed transactions or access requests might still occur with such a protocol, in some embodiments.

Preferred embodiments of the current invention can solve these and other problems by introducing capacity-based admission before any request processing, for those requests that are received within a certain period of time. In some embodiments, this can be accomplished by introducing a data structure, such as a small queue in some of these embodiments, before any request processing at a storage node. In other embodiments, this data structure might be a hash table, linked list, stack, array, table, or any other data structure that can store entries. Request processing at a storage node can include preparing an item transaction, performing an item transaction, or any other kind of access request processing performed at a storage node. This data structure can replace latency for throughput, in some embodiments.

In some embodiments, information regarding received access requests can be entered in this data structure. Then the data structure can be sorted, in some embodiments. The data structure might be sorted by any number of criteria, or combination of criteria. For example, the data structure might be sorted by a timestamp added by either the transaction coordinator node or the request routing node, in some embodiments. As another example, the data structure might be sorted by a request priority, or a request difficulty, in some embodiments. For example, higher priority requests might be sorted to be first in the data structure, or requests with the least amount of difficulty might be sorted to be first, or requests with the greatest difficulty might be sorted to be first, in some embodiments. In other embodiments, a combination of criteria might be used to sort the data structure, such as sorting by priority first, and then sorting by timestamp for those requests that have the same priority, as an example. There a multitude of different kinds of criteria, or combination of criteria, that might be used to sort the data structure, and the above examples should not be construed as being limiting.

The storage node or partition, or an executor associated with the storage node or partition, might begin the sorting operation of the data structure based on various criteria. A sorting operation might commence after a given period of time, in some embodiments. This period of time can be 5 ms, in some embodiments. A sorting operation might commence when the data structure has reached a certain capacity or limit of entries, in some embodiments. This capacity or limit might be predetermined, in some embodiments. The limit might be when the data structure is full, in some embodiments. At least some of the storage nodes or partitions might be synchronized, in some embodiments, such that the sorting operation occurs either simultaneously, or at least around a similar point in time. In other embodiments, each storage node or partition might perform its sorting operation independently of the other storage nodes. In some embodiments, any synchronization or coordination is not required since only one, or only a few, of the storage nodes run hot, such that they receive more requests than their capacity allows them to handle. Other embodiments might employ other mechanisms to either coordinate, or to not coordinate, the sorting operation across one or more of the storage nodes.

After the information about the received requests in the data structure are sorted, in these preferred embodiments, then the processing of those requests associated with those entries can be attempted in the order of the sorted entries. If the different storage nodes or partitions use same or similar criteria to sort the entries in their corresponding data structures, then it can be more likely that the same or similar transactions are processed first, or at least sooner, across the different storage nodes or partitions, in these embodiments. Therefore, there will be a higher probability that one or more transactions will be able to access all the resources needed across all the required storage nodes or partitions, without being denied access because of a lack of IO capacity at one or more of its required storage nodes, in these embodiments. Therefore, the group of pending transactions should have a higher probability of making progress by allowing one or more of the pending transactions to be completed during a given period of time.

In these preferred embodiments, transactions can have less of a probability of interfering with each other, and therefore causing one another to fail through contention for the same resources, where one or more of the failed transactions would have succeeded if it had not been for the other failed transactions. In these preferred embodiments, one or more of the transactions in contention might be able to consume IO on all of its required storage nodes in order to complete, while the other transactions do not consume IO on any, or at least on fewer, of its required storage nodes. This will allow failed transactions to not prohibit other transactions from completing, in some embodiments.

FIG. 1 is a logical block diagram illustrating admitting for performance ordered operations of atomic transactions across a distributed database, according to some embodiments.

Distributed database 100 may store data for a database (e.g., a partition of a database table) across one or multiple locations, such as at different storage nodes 120, in some embodiments. Distributed database 100 may be any of various types of database systems, including relational and non-relational database systems that may allow transaction requests, in some embodiments. Operation requests for different transactions 110 may be submitted, routed, or dispatched to storage node(s) 120 to perform the requested transactions.

In order to ensure that the performance of transactions that may occur across multiple storage nodes 120 does not impede the performance of other different transaction requests 110, storage nodes 120 may implement capacity-based admission 140 for the requests received within a period of time 130. In some embodiments, this might include determining an ordering for processing received access requests 130, as indicated by the admitted requests 150, in some embodiments. These admitted request 150 can then be processed by request processing functionality 160. Each storage node 120 may determine whether to accept a proposed request (e.g., whether the request can be performed without violating ACID properties for transactions or the performance of non-transaction access requests), and in what order the request should be performed relative to other received requests without consulting or relying upon other storage nodes 120, in some embodiments. For example, a received operation request 130 can be accepted or rejected (if conflicting) at storage node 120 which may also be performing another transaction received, without requesting information from any other node.

For example, as discussed below with regard to FIG. 6, some operation requests received within a period of time might be admitted for performance according to an order for performing the transactions at the distributed system, until a capacity of the one node to perform the requests for operations is exceeded, in some embodiments. This ordering might be based on one or more criteria, such as a sequence number or timestamp applied by an upstream node, such as a transaction coordinator node. These sequence numbers or timestamps may be independently assigned, for example at an upstream node such as a transaction coordination node, and the operation requests then ordered, such as sorted, based on the assigned values such as the sequence values or timestamps, in some embodiments. In this way, synchronization to implement a global sequence across all transaction coordinator nodes and/or storage nodes 120 does not have to be implemented, in some embodiments, reducing work and traffic between nodes of a distributed database. Instead, each storage node 120 can reason independently about the order in which the operation requests received at the storage node 120 should be performed (or if they should be performed) without violating ACID principles for transactions, in some embodiments.

Please note that any previous descriptions of implementing admitting for performance ordered operations of atomic transactions across a distributed database are not intended to be limiting, but are merely provided as logical examples.

This specification continues with a general description of a provider network that may implement a database service that may implement admitting for performance ordered operations of atomic transactions across a distributed database. Then various examples of a database service are discussed, including different components/modules, or arrangements of components/module, that may be employed as part of implementing the database service, in one embodiment. A number of different methods and techniques to implement admitting for performance ordered operations of atomic transactions across a distributed database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
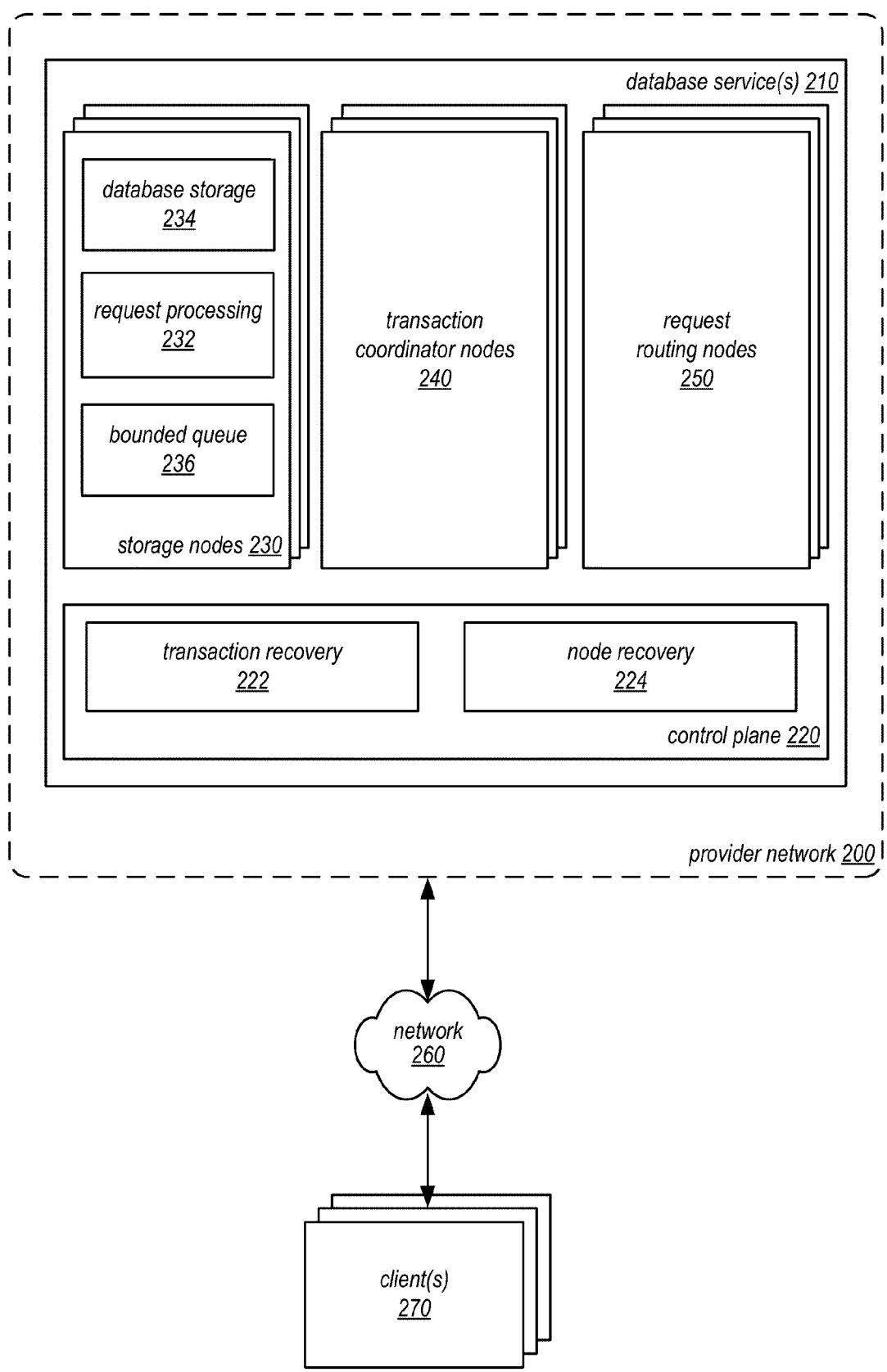
FIG. 2 is a logical block diagram illustrating a provider network that implements a database service that may implement admitting for performance ordered operations of atomic transactions across a distributed database, according to some embodiments.

FIG. 2 is a logical block diagram illustrating a provider network that implements a database service that may implement admitting for performance ordered operations of atomic transactions across a distributed database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and storage services offered by the provider network 200. In one embodiment, provider network 200 may implement various computing resources or services, such as database service(s) 210 (e.g., relational or non-relational (NoSQL) database query engines), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 14 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services that implement or allow transactions.

In one embodiment, clients 270 may encompass any type of client configurable to submit network-based requests to provider network 200 via network 260, including requests for database service(s) 210 (e.g., to perform a transaction to a database hosted in database service 210). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service(s) 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 270 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service).

In one embodiment, a client 270 may provide access to provider network 200 to other applications in a manner that is transparent to those applications. For example, client 270 may integrate with a database on database service(s) 210. In such an embodiment, applications may not need to be modified to make use of the storage system service model. Instead, the details of interfacing to the database service(s) 210 may be coordinated by client 270.

Client(s) 270 may convey network-based services requests to and receive responses from provider network 200 via network 260, in one embodiment. In one embodiment, network 260 may encompass any suitable combination of networking hardware and protocols necessary to establish network-based-based communications between clients 270 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 250 may communicate with provider network 200 using a private network rather than the public Internet.

Figure 3A:
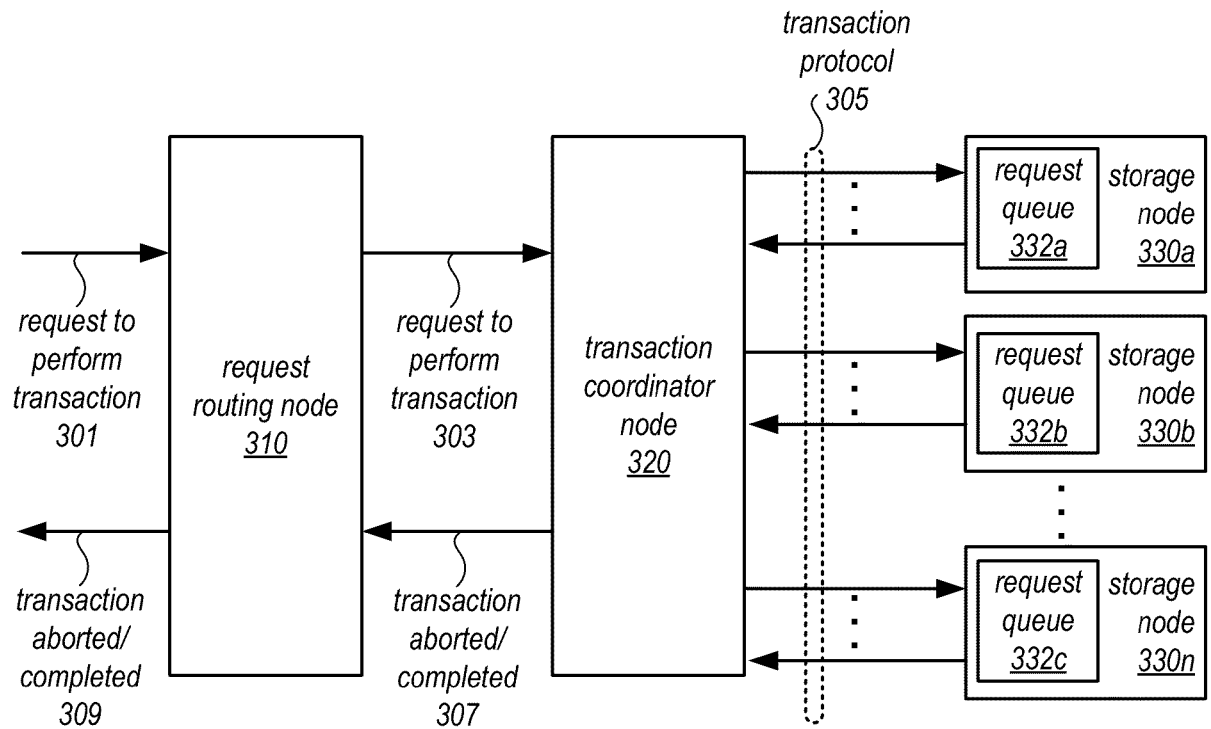
FIGS. 3A and 3B are logical block diagrams illustrating different routing paths for requests, according to some embodiments.
Figure 3B:
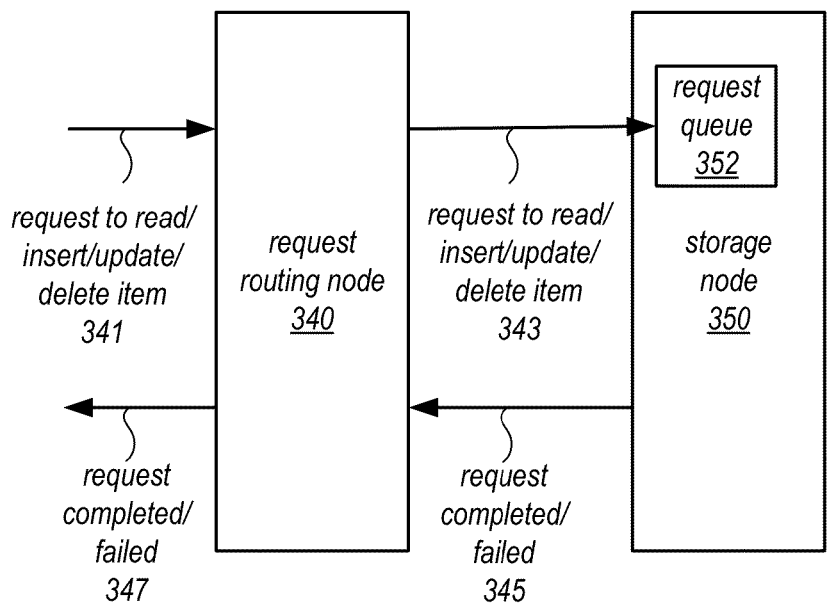

Database service 210 may implement request routing nodes 250, in one embodiment. Request routing nodes 250 may receive, authenticate, parse, throttle and/or dispatch service or other access requests, among other things, in one embodiment. For example, FIGS. 3A and 3B illustrate different routing paths for transactions and other access requests, according to some embodiments. As discussed below with regard to FIGS. 3A and 4 - 13, a transaction coordinator node, such as one of transaction coordinator nodes 240, may be included in the path for a request to perform a transaction, in some embodiments, while a non-transaction request may be sent directly to an appropriate storage node.

In one embodiment, request routing nodes 250 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in database service(s) 210.

In one embodiment, database service 210 may implement control plane 220 to implement one or more administrative components, such as automated admin instances which may provide a variety of visibility and/or control functions). Control plane 220 may provide visibility and control to system administrators, detect split events for partitions of tables at storage nodes, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 320 may direct the performance of different types of control plane operations among the nodes, systems, or devices implementing database service 210, in one embodiment. For instance, control plane 220 may communicate with processing nodes to initiate the performance of various control plane operations, such as moves, splits, update tables, delete tables, create indexes, etc.... In one embodiment, control plane 220 may include a node recovery feature or component that handles failure events for storage nodes 230, transaction coordinator nodes 240, and request routing nodes 250 (e.g., adding new nodes, removing failing or underperforming nodes, deactivating or decommissioning underutilized nodes, etc). Control plane 220 may implement transaction recovery 222 to detect or handle the failure of aborted, stalled, or other transactions, in some embodiments.

In one embodiment, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement request processing 232, in one embodiment. Request processing 232 may create, update, define, query, and/or otherwise administer databases, in one embodiment. For instance, request processing 232 may maintain a database according to a database model (e.g., a relational or non-relational database model). In one embodiment, request processing 232 may allow a client to manage data definitions (e.g., Data Definition Language (DDL) requests to describe column definitions, requests to add item attributes, etc.). In one embodiment, request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, request processing 232 may also perform other management functions, such as enforcing access controls or permissions, concurrency control, or recovery operations.

Storage nodes 230 may implement a data structure, such as a bounded queue 236 in some of these embodiments, before any request processing 232 at a storage node. In other embodiments, this data structure might be a hash table, linked list, stack, array, table, or any other data structure that can store entries. This data structure can replace latency for throughput, in some embodiments. In some embodiments, information regarding received access requests can be entered in this data structure. Then the data structure can be sorted, in some embodiments. The data structure might be sorted by any number of criteria, or combination of criteria. For example, the data structure might be sorted by a timestamp added by either the transaction coordinator node or the request routing node, in some embodiments. As another example, the data structure might be sorted by a request priority, or a request difficulty, in some embodiments. For example, higher priority requests might be sorted to be first in the data structure, or requests with the least amount of difficulty might be sorted to be first, or requests with the greatest difficulty might be sorted to be first, in some embodiments. In other embodiments, a combination of criteria might be used to sort the data structure, such as sorting by priority first, and then sorting by timestamp for those requests that have the same priority, as an example. There a multitude of different kinds of criteria, or combination of criteria, that might be used to sort the data structure, and the above examples should not be construed as being limiting.

In one embodiment, database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the database service 210. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments. As discussed below with regard to FIG. 5, in some embodiments, items in a table may include attributes that are either system data or application data.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to reconfigure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

FIG. 3A illustrates a routing path for requests to perform transactions. A request routing node 310 may receive a request 301 to perform a transaction (e.g., a TransactItems request). In some embodiments, the request 301 may include one or more operations to perform as part of the transaction (e.g., read/get, write/update, insert/add, delete/remove operations). In at least some embodiments, the request 301 may include preconditions to be met in order for the transaction to commit. For instance, a precondition may check that an attribute exists or that it has a specific value or that its value begins with a particular string. Preconditions may involve any items in any tables and are not limited to the items being updated in the transaction (e.g., a transaction is performed upon table A but a precondition can be specified and evaluated with respect to table B). As an example, suppose that an application wishes to transfer $50 from Bob's bank account to Mary's account. This application may first read both Bob's and Mary's account balances, compute the adjusted amounts, and then submit a transaction that writes new balances with the condition that the balances did not change between when they were read and when the transaction was processed.

Request routing node 310 may dispatch or send the request 303 to perform the transaction 303 to a selected transaction coordination node 320 (e.g., according to various load balancing or other request distribution techniques), in some embodiments. Transaction coordinator node 320 may perform a transaction protocol 305, discussed in detail below with regard to FIGS. 4 and 8, in some embodiments. Request may be sent to one or multiple storage nodes, such as storage nodes 330*a*, 330*b*, and 330*n*. Each of these storage nodes might contain a data structure, such as a request queue 332*a*, 332*b*, and 332*c*, respectively, in some of these embodiments. Storage nodes 330 may order the transaction (or reject/abort/fail it) according to a timestamp value or other sequence value assigned to it by transaction coordinator node 320, as discussed above with regard to FIG. 1 and below with regard to FIGS. 4, 5, 7, and 9 - 13 along with other transactions received from transaction coordinator 320 and/or directly from request routing node 310 (or other request routing node). The storage nodes 330 may use the corresponding data structures, such as the request queues 332 to accumulate the requests for transactions, or requests for operations associated with transactions over a period of time, and then to order these requests, in some embodiments. Transaction coordinator node 320 may return an indication as to whether the transaction aborted or completed successfully to request routing node 310, which in turn may return an indication as to whether the transaction aborted or completed 309 (e.g., to a requesting client).

FIG. 3B illustrates another routing path for requests to perform access requests, according to some embodiments. As indicated at 341, a request routing node 340 may receive a request to read, inset, update, or delete an item in a database table, in some embodiments. Instead of routing the request to a transaction coordinator, like transaction coordinator 320 in FIG. 3A, request routing node 340 may direct the request 343 directly to a storage node that stores the item (e.g., in the appropriate partition of a database table), in some embodiments. For example, request routing node 340 may maintain a listing or other information describing a partitioning scheme for a table (e.g., a primary key value and hash function to determine a hash value that may be mapped to one partition of the table. Storage node 350 may determine whether to complete or fail the request to read, insert, update, or delete the item, according to the techniques discussed below with regard to FIGS. 9 - 13, independently from other storage nodes or a transaction coordinator to perform a transaction that includes an operation to be performed at storage node 350. As indicated at 345 and 347, an indication that the request completed or failed may be provided to request routing node 340, which may in turn provide the request completion/failure notification to a client.

Figure 4:
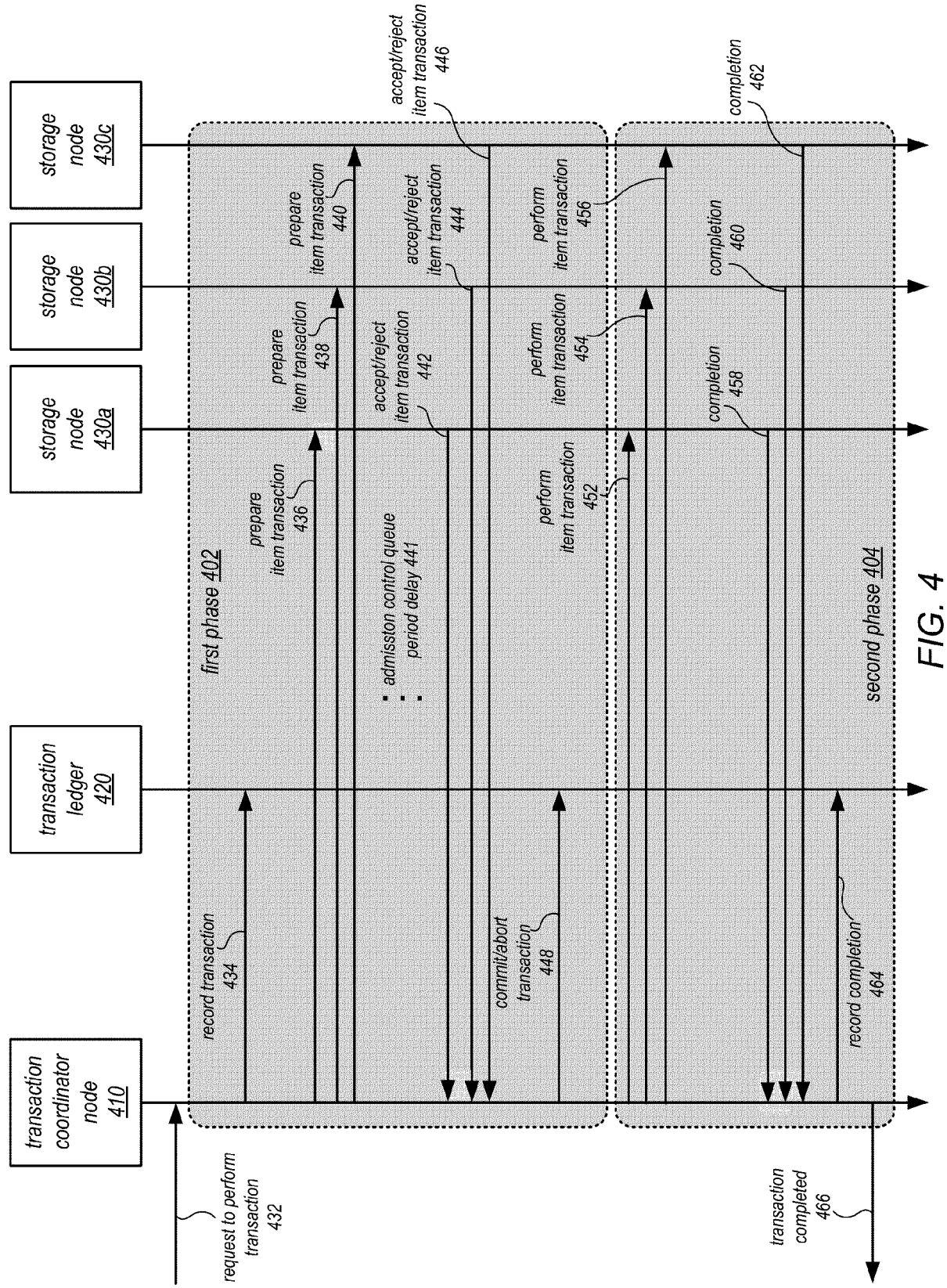
FIG. 4 is a sequence diagram illustrating a transaction protocol, according to some embodiments.
Figure 5A:
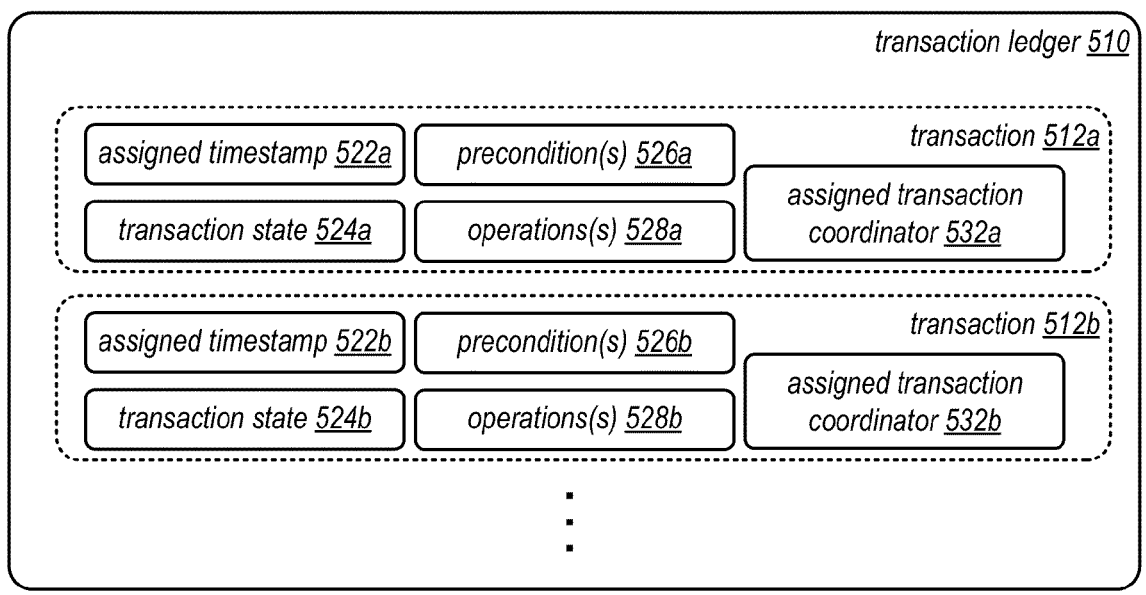
FIG. 5A is an example transaction ledger for performing a transaction protocol, according to some embodiments.

FIG. 4 is a sequence diagram illustrating a transaction protocol, according to some embodiments. In at least some embodiments, a two-phase protocol may be implemented for a transaction coordinator to determine whether a transaction can be committed to a distributed database. A request to perform a transaction may be received 432 at transaction coordinator node 410, in some embodiments. Transaction coordinator 410 may record the transaction 434 in transaction ledger 420, in some embodiments. FIG. 5A is an example transaction ledger for performing a transaction protocol, according to some embodiments.

In various embodiments, transaction ledger 420 may be maintained to ensure the survival of transactions beyond the failure of individual transaction coordinators. For example, to ensure that a failure of a transaction coordinator, such as transaction coordinator 410, does not result in a partially executed transaction, which would violate an atomicity guarantee for the transaction that all (or none) of a transaction completes, the transaction coordinator may store various information about the transaction so that the transaction can be resumed by another transaction coordinator in some embodiments. In FIG. 5A, transaction ledger 510 (which may be similar to transaction ledger 420 in FIG. 4) may store transactions across database service 210 (or a portion thereof), in some embodiments.

A transaction entry, such as entries 512*a* and 512*b*, may include, a timestamp assigned to the transaction by the transaction coordinator 522*a* and 522*b*, preconditions (if any) of operations performed in the transaction 526*a* and 526*b*, the operations to be performed (e.g., reads, writes, updates, inserts, additions, deletions, etc.) 528*a* and 528*b* and an identifier of the assigned transaction coordinator 532*a* and 532*b*, in some embodiments. The state of the transaction, transaction state 524*a* and 524*b*, may be included and updated, in some embodiments. For example, the possible states of transaction state 524 may include "Started," "Committed," "Completed," or "Aborted."

A transaction ledger may be implemented using various storage technologies or systems, in some embodiments. For example, transaction ledger 420 may be implemented as another table in database service 210 or hosted in another type of storage system or service in provider network 200. In at least some embodiments, transaction ledge may be organized as an append-only log. In some embodiments, transaction ledger 420 may support operations for scanning and truncating the log. In some embodiments, portions of the ledger that contain already committed or aborted transactions can be discarded using truncation to reclaim space and to reduce the number of records (e.g., when scanned for transaction recovery). In some embodiments, transaction records may be retained for a period of time to support additional features such as monitoring and/or debugging. In some embodiments, transactions on different tables may share the same transaction ledger. In some embodiments, multiple transaction ledgers could be used in parallel. In some embodiments, transactions can be assigned to a ledger using a fixed assignment, e.g. all transactions on tables in a specific customer account use a specific ledger, or can be randomly assigned to a transaction ledger. In at least some embodiments, transaction ledgers may be used to provide a stream of transactions performed in database and/or table that are sent to another system.

Turning back to FIG. 4, transaction coordinator may send requests to prepare an individual item within the transaction, such as requests 436, 438, and 440, for the transaction to the storage nodes that store the transaction, such as storage nodes 430*a*, 430*b*, and 430*c*. Storage nodes 430 may also receive a timestamp value assigned to the transaction, as well as further information, for determining whether the storage node 430 can accept the transaction for the item, in some embodiments, based on an evaluation of the timestamp and other information maintained for the item by storage nodes 430*a*.

Figure 5B:
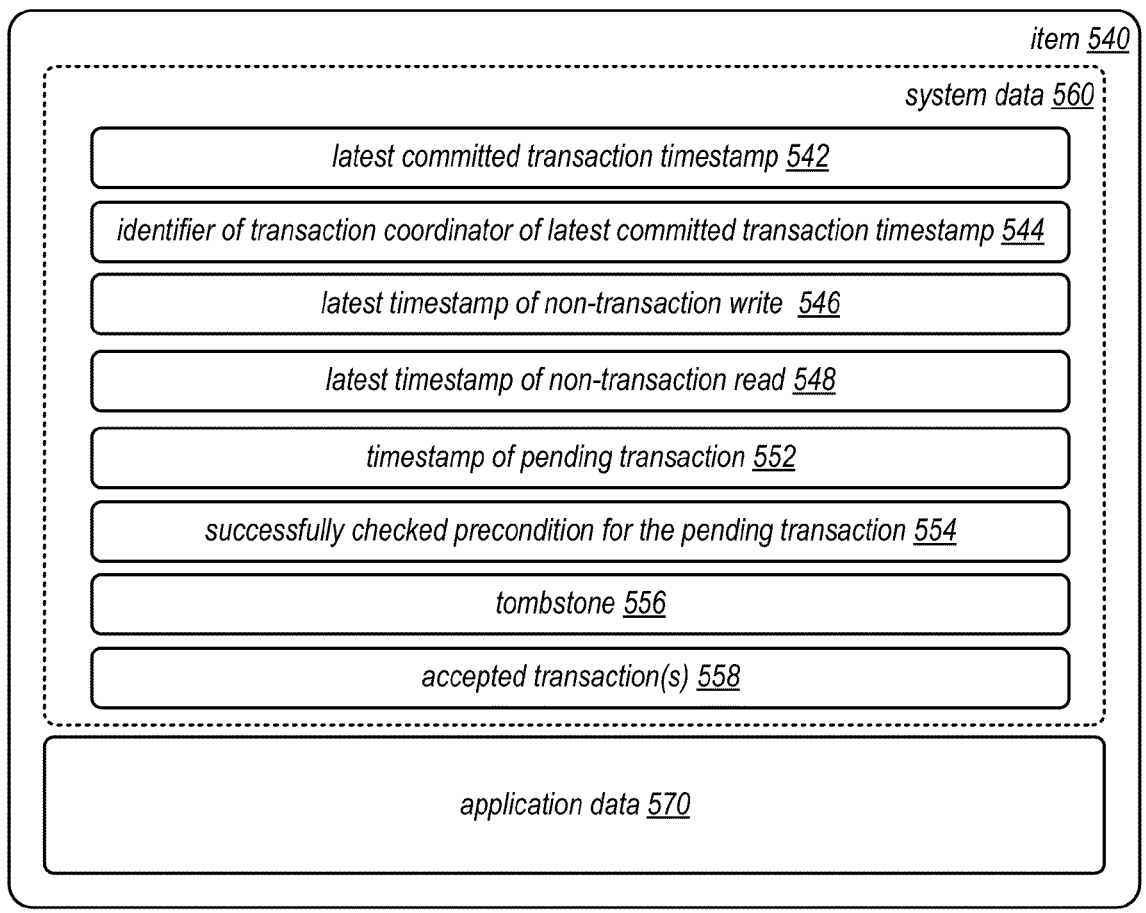
FIG. 5B is an example item that includes system data for admitting for performance ordered operations of atomic transactions across a distributed database, according to some embodiments.

FIG. 5B is an example item that includes system data for admitting for performance ordered operations of atomic transactions across a distributed database, according to some embodiments. Item 540 may maintain system data 560 (e.g., as attributes of the item 540 or in a separate collection of data describing one or multiple items) and application data 570 (e.g., application visible data used by an application when interacting with item 540), in some embodiments. System data 560 may include various information for ordering, accepting, and/or rejecting transaction requests and non-transaction requests at storage nodes. For example, system data 560 may include a timestamp of a latest committed transaction operation 542 that has written to the item, an identifier 544 of a transaction coordinator that submitted the transaction of the latest committed transaction operation 542 that has written to the item, a timestamp of the latest non-transaction write to the item 546, a timestamp of the latest read of the item 548, a timestamp of pending transaction 552 that intends to write to the item, an indication of a successfully checked precondition for the pending transaction 554, an indication of whether item has been deleted according to a tombstone marker 556, and a history or set of transactions 558 that have been accepted but not yet performed, in some embodiments.

Returning to FIG. 4, storage nodes 430 may wait for a period of time in order to potentially accumulate multiple requests for operations associates with transactions in its corresponding data structure, such as a queue. This period time can be the admission control queue period delay 441. During this period of time information regarding received access requests, or operations associated with transactions, can be entered in this data structure. The storage node or partition, or an executor associated with the storage node or partition, might accumulate entries regarding operations for transactions or other access requests in the data structure based on various criteria. Accumulation might continue for a given period of time, in some embodiments. This period of time can be 5 ms, in some embodiments. Accumulation might continue until the data structure has reached a certain capacity or limit of entries, in some embodiments. This capacity or limit might be predetermined, in some embodiments. The limit might be when the data structure is full, in some embodiments.

Then the data structure, such as the queue, can be sorted, in some embodiments. The data structure might be sorted by any number of criteria, or combination of criteria. For example, the data structure might be sorted by a timestamp that was set by either the transaction coordinator node or the request routing node, in some embodiments. As another example, the data structure might be sorted by a request priority, or a request difficulty, in some embodiments. For example, higher priority requests might be sorted to be first in the data structure, or requests with the least amount of difficulty might be sorted to be first, or requests with the greatest difficulty might be sorted to be first, in some embodiments. In other embodiments, a combination of criteria might be used to sort the data structure, such as sorting by priority first, and then sorting by timestamp for those requests that have the same priority, as an example. There a multitude of different kinds of criteria, or combination of criteria, that might be used to sort the data structure, and the above examples should not be construed as being limiting.

After the data structure is sorted, operations associated with the entries in the data structure can be performed in the order of the sorted data structure entries. If those operations are requests to prepare an item transaction, such as 436, 438, and 440, then those storage nodes can perform those operations and determine whether to accept or reject the item transaction, in some embodiments. Storage nodes may next send respective determinations 442, 444, and 446 to transaction coordinator node 410, indicating whether the transaction for the item is accepted or rejected by the storage node. If transaction coordinator node 410 does not receive a response, transaction coordinator node 410 may retry a number of times before aborting the transaction. Based on the responses, transaction coordinator 410 may determine whether the transaction can be committed or aborted, in some embodiments. An update to transaction ledger 420 to reflect the decision 448 may be made, in some embodiments. The first phase 402 may be complete. Please note that further interactions as discussed below with regard to FIG. 8 may be performed if the transaction aborts which are not illustrated.

If the transaction is committed, second phase 404 may be performed by transaction coordinator node 410. Transaction coordinator node 410 may send respective requests to perform the item transactions, 452, 454, and 456, to storage nodes 430. Once storage nodes 430 have performed the item transactions (which may be performed according to an ordering or timing determined by storage nodes 430 after receipt of requests 452, 454, and 456, in some embodiments, then storage nodes 430 may return responses indicating completion, such as responses 458, 460, and 462. Transaction coordinator 410 may record 464 the state of the transaction as completed in transaction ledger 420 and send a completion indication 466 for the transaction (e.g., to a client or request routing node to forward to a client).

The examples of a database service that implements as discussed in FIGS. 2 -5B above have been given in regard to a database service (e.g., a non-relational or NoSQL database service or a relational database service). However, various other types of data access, management, or control systems or data processing systems may implement transactions across a distributed database and thus may implement admitting for performance ordered operations of atomic transactions across a distributed database, in other embodiments.

FIG. 6 is a high-level flowchart illustrating various methods and techniques to implement admitting for performance ordered operations of atomic transactions across a distributed database, according to some embodiments. These techniques, as well as the techniques discussed with regard to FIGS. 7-13, may be implemented using components or systems as described above with regard to FIGS. 2 - 5, as well as other types of databases, storage engines, or systems, and thus the following discussion is not intended to be limiting as to the other types of systems that may implement the described techniques.

As indicated at 610, different requests for operations may be received at a node of a distributed system, to be performed as part of different transactions to be performed at multiple nodes of the distributed system, where the different requests for operations are received within a period of time, in various embodiments. For example, a request to perform a transaction, as discussed above with regard to FIGS. 1, 3A, and 4, and FIG. 8 below may be received at a database system and dispatched or routed to a transaction coordinator node. In some embodiments, the request may be explicitly pointed to the transaction coordinator node (e.g., in scenarios where the transaction coordinator node may be identified to a client application as a transaction engine for the database).

The request may be formatted according to a protocol, interface (e.g., API), or other structure that identifies the request as a transaction, in some embodiments. The request may include the types of operation(s) to perform, in some embodiments, as a batch request. In some embodiments, the request may be the first of many requests associated with the transaction (e.g., after a BEGIN TRANSACTION SQL statement) which may subsequently submit additional operations to be included in the transaction, in some embodiments. Other information, such as preconditions for performing operations may also be included, in some embodiments. The transaction coordinator node may assign the transaction a sequence number (e.g., based on a monotonically increasing sequence or a timestamp value based on clock accessible to the transaction coordinator node), in some embodiments. The transaction coordinator node may forward the request to the storage node (or a portion thereof) to the storage node, in some embodiments.

As indicated at 620, the node of the distributed system may admit some of the different requests for operations received within the period of time for performance at the one node, according to an order for performing the transactions at the distributed system, until a capacity of the one node to perform the requests for operations is exceeded. Some of the different requests for operations received within the period of time may be admitted for performance at the storage node according to an order determined based, at least in part, a timestamp or on assigned sequence numbers, in some embodiments. For example, sequence number comparisons (e.g., like the timestamp comparisons discussed below) may be performed in order to order the requests. In some scenarios, the ordering may be further determined based on other factors, such as the arrival of the requests at the storage node and/or the type of request (e.g., a transaction or non-transaction, what type of non-transaction request, etc.). Finally, as indicated at 630, the storage node may reject the remainder of the different requests for operations received within the period of time that are not admitted by the one node.

Figure 7:
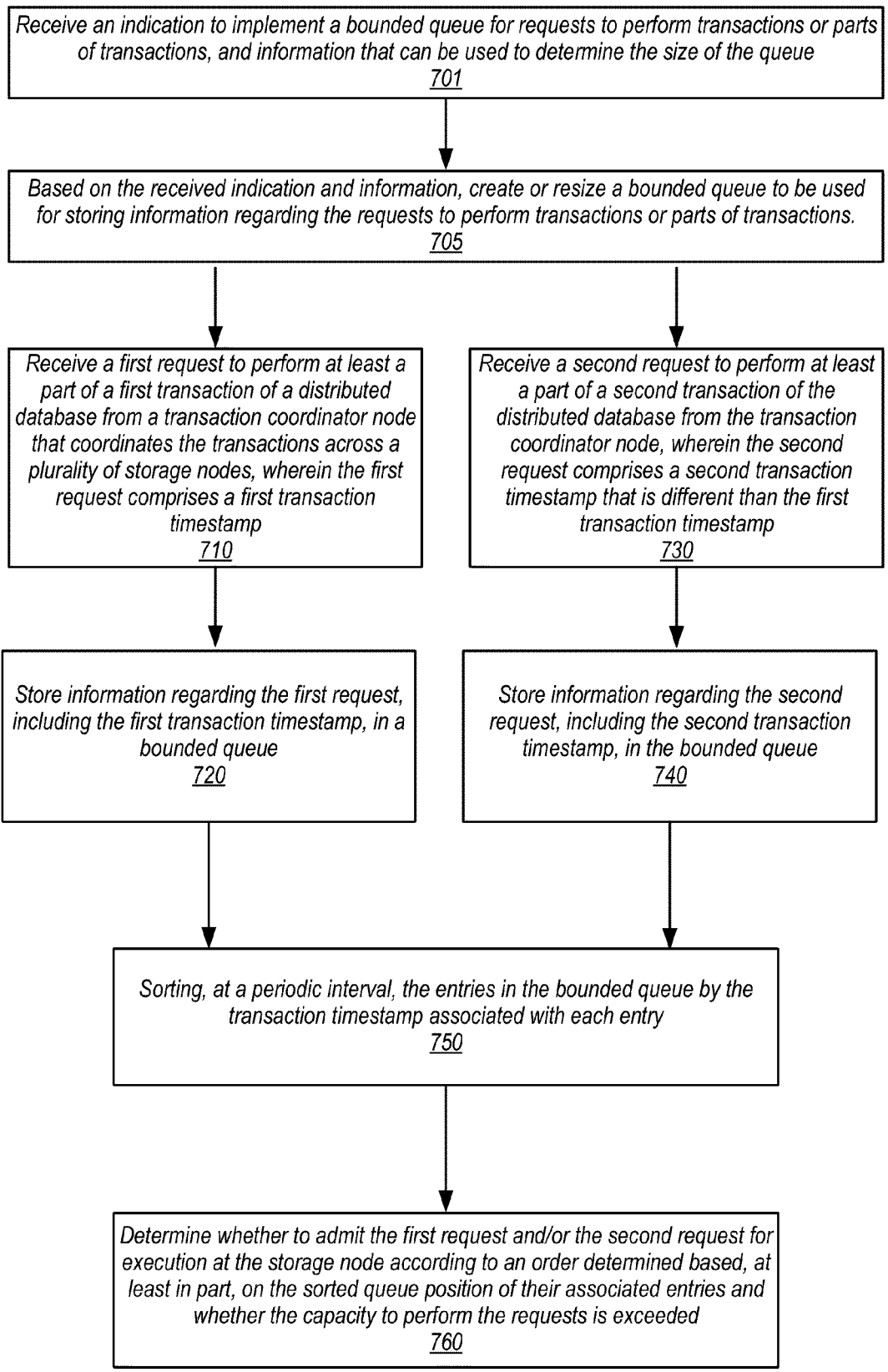
FIG. 7 is a high-level flowchart illustrating other methods and techniques to implement admitting for performance ordered operations of atomic transactions across a distributed database, according to some embodiments.

FIG. 7 is a high-level flowchart illustrating other methods and techniques to implement admitting for performance ordered operations of atomic transactions across a distributed database, according to some embodiments. First, at 701, a node such as a storage node may receive an indication to implement a data structure, such as a bounded queue, for requests to perform transactions or requests to perform at least parts of transactions, in some embodiments. A storage node might also receive, either with the indication or separately, information that can be used to determine the size of the data structure, according to some embodiments. First, regarding the indication to implement a data structure, this indication can be received from, for example, a transaction coordinator node that coordinates the transactions across a plurality of storage nodes. Else, this indication might be received from a request routing node, or another node in the distributed system, depending on the embodiment. The appropriate node may detect a triggering event to start implementing queues on some or all of the storage nodes. A triggering event might be, for example, an aborted transaction, in some embodiments. The transaction might be aborted because IOPS were not available to process all the requests for operations associated with the transaction at all the appropriate storage nodes, for example. The transaction coordinator node, or other appropriate node of the distributed system, might send this request to implement a data structure to all storage nodes, or only those storage nodes that were involved in the triggering event, such as the aborted transaction, or only those storage nodes which caused the triggering event, depending on the embodiment. For example, the transaction coordinator node might only send the request to implement a data structure to the storage nodes which rejected the request to prepare an operation associated with the transaction. A goal, in some embodiments, might be to minimize the global latency while maximizing throughput. Therefore, data structures might be implemented only on the storage nodes that are needed in order for requests for operations associated with transactions to be accepted instead of rejected, in some embodiments.

In addition to receiving the indication to implement the data structure for requests to perform transactions or requests to perform at least parts of transactions (such as operations associated with transactions), a storage node might also receive, as well, information that can be used to determine the size of the data structure, according to some embodiments. A transaction coordinator node, or other appropriate node of the distributed system, might determine the size of the data structure so that the storage node or nodes provide optimal, or at least better, throughput. This node might then inform the storage node the appropriate size of the data structure, in some embodiments. For example, this node might inform the storage node how many entries the data structure should have, or in some embodiments use, for implementing the storage of requests received within a period of time. The data structure size might be set as high as necessary in order to provide optimal throughput. Depending on the embodiment, some or all of this previously described functionality might be implemented on the individual storage nodes, instead of the transaction coordinator node, for example. Each individual storage node might determine the size of its own data structure once it receives an indication to implement the data structure, in some embodiments. The storage node might use the number of requests for operations that it receives over a given period of time in order to determine the data structure size, for example. In some embodiments, the storage nodes themselves might determine when to implement a data structure, such as a bounded queue, for received requests to perform transactions, or received requests to perform parts of transactions, instead of receiving an indication from another node.

Then, at 705, a node such as a storage node may create or resize a data structure, such as a bounded queue, or somehow set the number of entries to use in the data structure, for storing information regarding requests to perform transactions or parts of transactions. The storage node can do this, for example, based on the received indication and/or information from the transaction coordinator node, or other appropriate node in the distributed system, depending on the embodiment. In the embodiments where some or all of this previously described functionality might be implemented on the individual storage nodes themselves, the storage nodes might use the results of this functionality to create or resize its own data structure, or somehow set the number of entries to use in the data structure, for storing information regarding requests to perform transactions or parts of transactions.

At 710, a node such as a storage node may receive a first request to perform a part of a first transaction of a distributed database from a transaction coordinator node that coordinates the transactions across a plurality of storage nodes, wherein the first request comprises a first transaction timestamp. Then at 720, the node may store information regarding the first request, including the first transaction timestamp, in a data structure of some kind, such as a bounded queue in the embodiment given in 720. A second request might then also be received with similar actions taken. At 730, for example, the node receives a second request to perform a part of a second transaction of the distributed database from the transaction coordinator node, wherein the second request comprises a second transaction timestamp that is different than the first transaction timestamp, according to some embodiments. Then, at 740, the node stores information regarding the second request, including the second transaction timestamp, in the data structure, such as the bounded queue of 720. After at least the two requests have been received, and possibly more requests have been received and stored in the corresponding data structure, such as the bounded queue, the entries in the data structure are sorted. In the embodiment of 750, the entries in the bounded queue are sorted at a periodic interval by the transaction timestamp associated with each entry. As explained previously, other embodiments might sort by different criteria instead of the transaction timestamp, and sorting might begin using different criteria, instead of at a periodic interval. Finally, at 760 the node will determine whether to admit the first request and/or the second request for execution at the storage node according to an order determined based, at least in part, on the sorted queue position of their associated entries and whether the capacity to perform the requests is exceeded.

Figure 8:
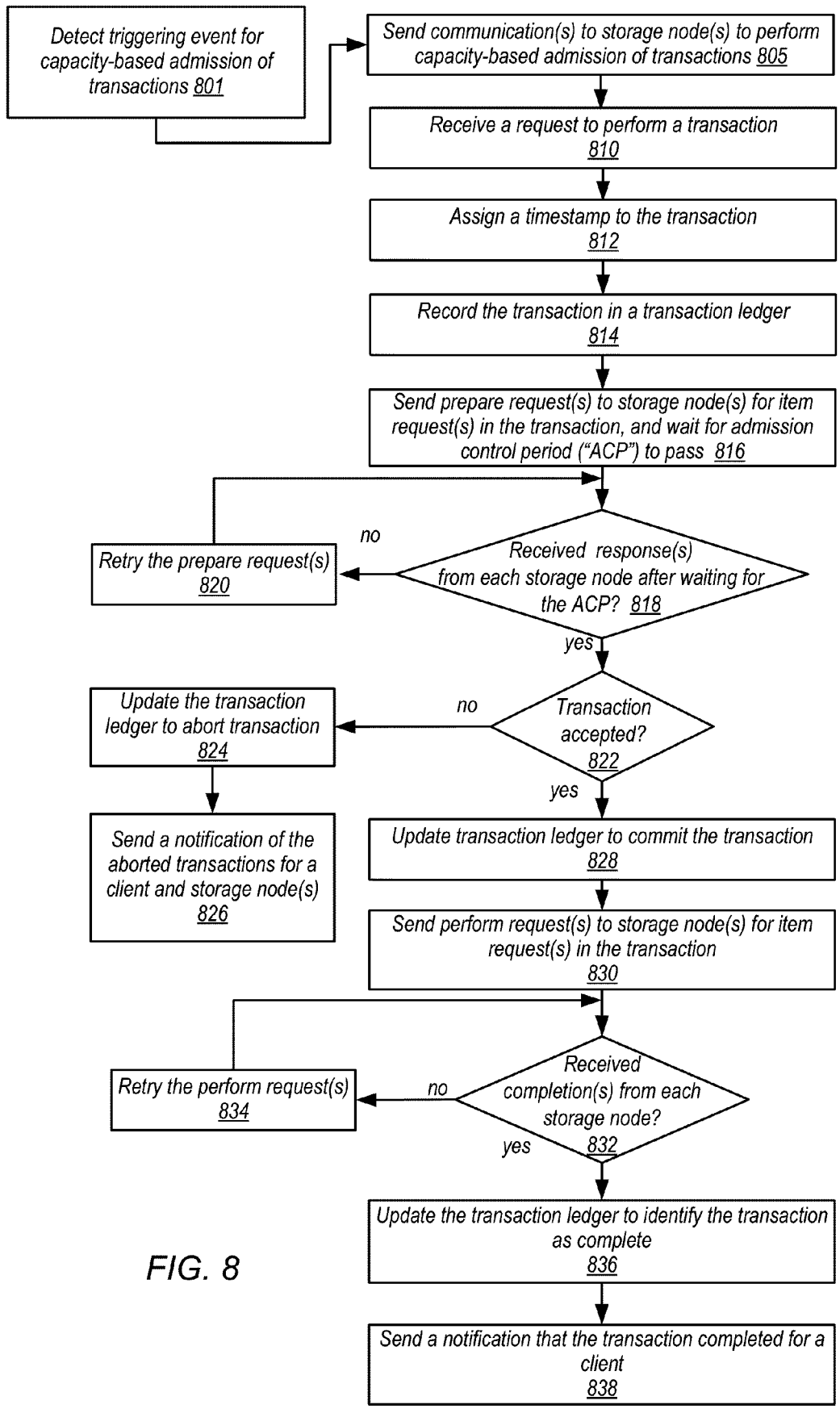
FIG. 8 is a high-level flowchart illustrating various methods and techniques to coordinate the performance of a transaction across storage nodes that order operations of atomic transactions across a distributed database, according to some embodiments.

A transaction coordinator node may implement various transaction protocols to determine whether a transaction can be performed or aborted at distributed database. FIG. 8 is a high-level flowchart illustrating various methods and techniques to coordinate the performance of a transaction across storage nodes that order operations of atomic transactions across a distributed database, according to some embodiments. First, at 801, at 801, a node such as a transaction coordinator node may detect a triggering event for capacity-based admission of transactions. The transaction coordinator node might coordinate transactions across a plurality of storage nodes, in some embodiments. Else, this functionality might be performed by a request routing node, or another node in the distributed system, depending on the embodiment. The appropriate node may detect a triggering event to start implementing queues on some or all of the storage nodes, in some embodiments. A triggering event might be, for example, an aborted transaction, in some embodiments. The transaction might be aborted because IOPS were not available to process all the requests for operations associated with the transaction at all the appropriate storage nodes, for example. The transaction coordinator node, or other appropriate node of the distributed system, might, at 805, send a communication to perform capacity-based admission to all storage nodes, or only those storage nodes that were involved in the triggering event, such as the aborted transaction, or only those storage nodes which caused the triggering event, depending on the embodiment. For example, the transaction coordinator node might only send the communication to perform capacity-based admission of transactions to the storage nodes which rejected the request to prepare an operation associated with the transaction. A goal, in some embodiments, might be to minimize the global latency while maximizing throughput. Therefore, data structures might be implemented only on the storage nodes that are needed in order for requests for operations associated with transactions to be accepted instead of rejected, in some embodiments.

As indicated at 810, a request to perform a transaction may be received, in some embodiments. The request may be received at a transaction coordinator node, for instance, which may assign a timestamp to the transaction, as indicated at 812. As indicated at 814, the transaction may be recorded in a transaction ledger, in some embodiments.

For example, an entry for the transaction identifying the state of the transaction (e.g., "started") may be created, along with other information, such as a timestamp assigned to the transaction by the transaction coordinator, preconditions (if any) of operations performed in the transaction, the operations to be performed (e.g., reads, writes, updates, inserts, additions, deletions, etc.), and an identifier of the assigned transaction coordinator node, in some embodiments.

The transaction may be divided into slices or other portions so that the performance of an operation may be individually coordinated, in some embodiments. As indicated at 816, prepare request(s) may be sent to storage node(s) for item request(s) in the transaction, in some embodiments. For example, a key value for each item operated on in the transaction may be used to identify a partition of the database table at which the item is stored (and a corresponding storage node for the partition), in some embodiments. The request(s) may include the assigned timestamp for storage node decision-making, as discussed below. In some embodiments, the method may wait for an admission control period to pass, as specified in 816. This admission control period allows for the individual nodes to accumulate the requests that are sent to them, store information regarding those requests in a data structure, wait for a period of time to accumulate requests, sort the requests using various criteria, and perform the operations associated with the sorted entries of the data structure in the order of the sorted entries, and then to send responses back.

As indicated at 818, if responses are not received from each storage node after waiting for the admission control period, then, the prepare requests (for the non-responsive storage nodes) may be retried, in some embodiments, as indicated at 820. In some embodiments, not illustrated, a transaction may be aborted if the storage nodes do not respond within a threshold period of time. If all responses are received, then a determination may be made as to whether the transaction was accepted, as indicated at 822. For example, if all storage nodes do not indicate that the individual requests to prepare the items for the transactions were accepted, then the transaction is to be aborted, as indicated by the negative exit from 822. As indicated at 824, in such a scenario, the transaction ledger may be updated to abort the transaction and a notification of the aborted transaction may be send to a client (or request routing node) and storage node(s) to remove the transaction, as indicated at 826, in some embodiments.

If the transaction is accepted, then as indicated at 828, the transaction ledger may be updated to indicate that the transaction is accepted, in some embodiments. As indicated at 830, requests to perform the item requests in the transaction, as indicated at 830, in some embodiments. As indicated at 832, a determination may be made as to whether completion acknowledgements have been received from each storage node. If not, then the requests to perform may be retried as indicated at 834. Once completions are received from each storage node, then as indicated at 836, the transaction ledger may be updated to identify the transaction as complete, in some embodiments. As indicated at 838, a notification may be sent that the transaction completed for a client, in some embodiments (e.g., to a client directly or request routing node).

Figure 9:
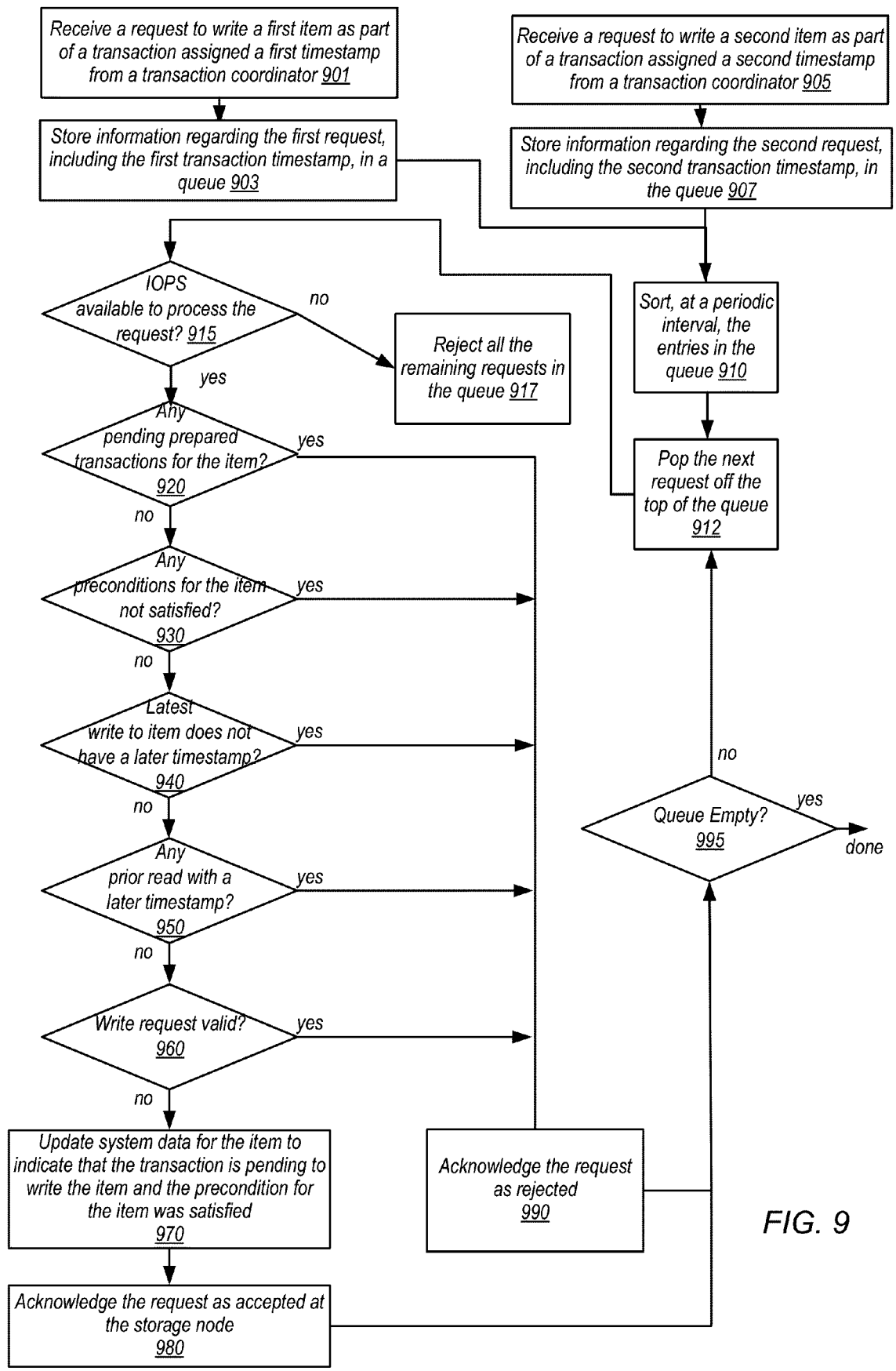
FIG. 9 is a high-level flowchart illustrating various methods and techniques to handle a request to write an item as part of a transaction, according to some embodiments.

As noted above, storage nodes may determine the ordering and/or performance of requests independently from other storage nodes (or a transaction coordinator node for non-transaction requests), in some embodiments. FIG. 9 is a high-level flowchart illustrating various methods and techniques to handle a request to write an item as part of a transaction, according to some embodiments.

As indicated at 901, a request to write an item as part of a transaction is received that is assigned a first timestamp from a transaction coordinator, in some embodiments. Then, at 903, information regarding the first request, including the first transaction timestamp, is stored in the data structure, such as a queue. In some embodiments, if the request is request to commit an item, or a request to actually perform the operation associated with the transaction, then this type of request might not be stored in the data structure at all, and instead might be processed, or at least sent to a request processing module, depending on the embodiment. This type of request might "jump the queue" or "jump the data structure" since capacity-based admission is not needed for these types of requests, in some embodiments.

At 905, which can occur before, after, or simultaneously with 901 or 903, a request to write a second item as part of a transaction, that is assigned a second timestamp from the transaction coordinator is received. At 907, information regarding the second request, including the second transaction timestamp, is stored in the queue. Again, if the request is request to commit an item, or a request to actually perform the operation associated with the transaction, then this type of request might not be stored in the data structure at all, and instead might be processed, or sent to a request processing module, depending on the embodiment, instead of being stored in the data structure. At 910, the entries in the queue are sorted at a periodic interval. As explained previously, the sorting might occur based on other criteria besides a periodic interval, depending on the embodiment. In addition, as explained previously, the data structure might not be a queue, but might be another kind of data structure where entries can be stored, depending on the embodiment. In some embodiments, the entries in the data structure are sorted such that an entry associated with a request comprising an earlier timestamp is arranged before an entry associated with a request comprising a later timestamp. The flowchart transitions to 912 where the next request is popped off the top of the sorted queue. If the data structure is not a queue, then the first entry in the sorted data structure is retrieved by a method appropriate for that data structure, depending on the embodiment. This request might be the request to write the first item, or the request to write the second item, depending on what sorting criteria was used in step 910. In the embodiments where entries in the data structure are sorted such that an entry associated with a request comprising an earlier timestamp is arranged before an entry associated with a request comprising a later timestamp, then the first entry retrieved from the data structure is the entry associated with the request comprising the earliest timestamp.

The flow then transitions to 915 where it is determined whether capacity exists to perform the operation associated with the entry retrieved from the sorted data structure, in this case the entry popped off the queue. In this embodiment, the entry is associated with a request to write an item. Furthermore, in the embodiments shown in item 915, the method determines whether IOPS are available to process the request. If no IOPS are available to process the request, then the flow transitions to 995 where all the remaining requests associated the remaining entries in the data structure are rejected, in some embodiments. In the embodiment shown in 995, all the remaining requests in the queue are rejected. If, however, IOPS are available to process the received request associated with the entry from the queue, then the flow transitions to 920 and begins perfuming various other checks.

These various other checks may be performed to determine whether the request can be acknowledged as accepted. For example, as indicated at 920 the storage node checks that there are no pending, already prepared, transactions involving this item, in one embodiment. As indicated at 930, the storage checks that the preconditions (if existent) for the given item are met, in some embodiments. For example, if a precondition specifies a value for another attribute of another item in another table (e.g., value == "TRUE"), then the precondition may be satisfied. As indicated at 940, the storage node may check that the latest write performed on the item, either by a transaction or a singleton operation (e.g., a write, delete, update, add, etc.), did not have a later timestamp, thereby rendering the current transaction obsolete, in some embodiments. For example, a timestamp comparison may be made alone, but if a tied value is found (which would be impossible if the transactions were from the same transaction coordinator node), then the transaction coordinator identifier may be used as a tie-break value (e.g., the lesser of the transaction identifier values being the "winner").

As indicated at 950, the storage node may check that a prior read did not have a later timestamp than this proposed transaction, in some embodiments. By checking for this scenario, the storage node may prevent the transaction from performing a write that would have affect the result of that read, in some embodiments. As indicated at 960, the storage node may check to determine if the write request is valid. For example, by determining that writing the item would not raise any validation errors such as exceeding the maximum item size or adding a numerical value to a string attribute.

For a request that fails any one of the checks, the request may be acknowledged by the storage node as rejected, in some embodiments, as indicated at 990. For requests that satisfy the checks, system data may be updated, as indicated at 970 in order to allow for proper evaluation of future requests (e.g., transactions and other non-transaction requests). The system data for the item may be updated to indicate that the transaction is pending to write the item and the precondition for the item was satisfied, in some embodiments. As indicated at 980, the request may be acknowledged as accepted at the storage node, in some embodiments. From either 980 or 990, the flow then transitions to 995 where it determines whether the queue is empty. If the queue is empty, then the process is finished. While not shown in the figure, once the queue is empty, instead of being done, the process can further wait for future requests to be received, in which case the process would return to 901 or 905, in some embodiments. If the queue is not empty, then the process flow returns to 912 where the next entry is retrieved from the data structure, which in these embodiments means popping the next entry off the top of the queue.

Application of the described checks can lead to various different acceptance/rejection scenarios. Consider the case of a new transaction (Tx2) whose prepare message arrives at a storage node after transaction (Tx1) and writes at least one of the same items. If Tx2 was assigned an earlier timestamp than that of Tx1, and Tx2 and Tx1 arrived within the same periodic internal, then Tx2 would be sorted to be an earlier entry in the data structure than Tx1, in some embodiments, and Tx2 would therefore be the first request to be processed by the flow diagram. However, if Tx2 arrived in a subsequent periodic interval, then Tx1 would be a previously completed request, and Tx2 may be rejected. In this scenario, executing Tx2 after Tx1 may leave the table in a state that is not consistent with the respective assigned timestamps. Thus, in some cases ordering of transactions different from their respective timestamps can occur if different transaction coordinator nodes assigned timestamps to Tx1 and Tx2, and these coordinators have clocks that are out-of-sync. However, in other scenarios where Tx2 has a later commit time, Tx2 will be accepted unless Tx2 has a precondition on the item that is not currently satisfied, as evaluated at 930.

Consider another example. Suppose that Tx2 arrives in a periodic interval after Tx1 at a storage node, and Tx1 has been accepted but not completed. If Tx1 and Tx2 had arrived in the same periodic interval, then their entries would have been sorted so that they would be executed according to their timestamp, in some embodiments, and so any conflict would be resolved in these embodiments. However, if they arrive in separate periodic intervals, and transactions Tx1 and Tx2 are concurrent transactions that are attempting to write the same item, they might be conflicting. But that does not mean that Tx2 is necessarily rejected, in this scenario. For example, if Tx2 was assigned an earlier timestamp than that of conflicting transaction Tx1, then Tx2 may likely be rejected. If Tx2 had been executed before Tx1 arrived, Tx2 would have left the table in a different state, and preconditions for Tx1 that were satisfied without Tx2 may have been violated with Tx2's prior execution. This could lead to Tx2 being rejected. However, it may be the case that Tx1 had no conditions on this item, in which case Tx2 can be accepted even though Tx1 has also been accepted. When accepting multiple concurrent transactions, the storage node may ensure that the concurrent transaction writes are performed in the correct order during a phase two protocol, similar to that discussed above with regard to FIG. 8, in some embodiments.

Another scenario may be where Tx2 has a commit time that is later than Tx1. If Tx1 and Tx2 arrived in the same periodic interval, then they would be executed in the appropriate order, in some embodiments. However, if they arrive in separate periodic intervals, then Tx2 can also be accepted if it has no preconditions on this item. On the other hand, if Tx2 has a precondition, it is possible that the execution of Tx1 will affect whether this condition is met. While the storage node could delay making a decision about Tx2 until after Tx1 completes, in some embodiments, in other embodiments the storage node may reject Tx2.

In various embodiments, a storage node may always perform the writes of any transactions that it has accepted and that were committed. However, the storage node may not necessarily physically perform the writes in the order defined by their timestamps. If the transactions arrive in the same periodic interval, and the entries associated with the transactions are sorted according to timestamp, then the storage node can perform the writes in the order defined by their timestamps. In most embodiments, this will necessarily be the case, since it will be rare that a request with an earlier timestamp does not arrive in the same periodic interval. Thus some embodiments of the current invention solve the problem of out-of-order execution, at least for a majority of the cases, along with the many other problems solved.

However, even when the transaction requests arrive in separate periodic intervals, then the storage node can still, for instance, ensure that the order in which transactions are executed leaves the tables in the equivalent state as if the transactions were executed serially. For example, suppose that two transactions Tx1 and Tx2 have both been accepted by some storage node, and that transaction Tx1 has a timestamp less than that of transaction Tx2. If the phase two for Tx1 is performed before phase two for Tx2, then the writes may be performed in the correct order as defined by the timestamps. However, if the storage node is asked to perform Tx2 while Tx1 is still in the accepted state, then Tx2 can be processed immediately as long as it is performing a request to add/put/insert the item or delete the item. Later, when the writes for Tx1 are requested, these operations can be ignored since they were made obsolete by Tx2's actions. On the other hand, if Tx2's write is a write/update/modify operation, then its outcome may be determined based on Tx1's write. In this case, the request to perform Tx2 may be rejected. The transaction coordinator node may wait a small amount of time to give Tx1 a chance to complete before retrying phase two for Tx2, in some embodiments.

Figure 10:
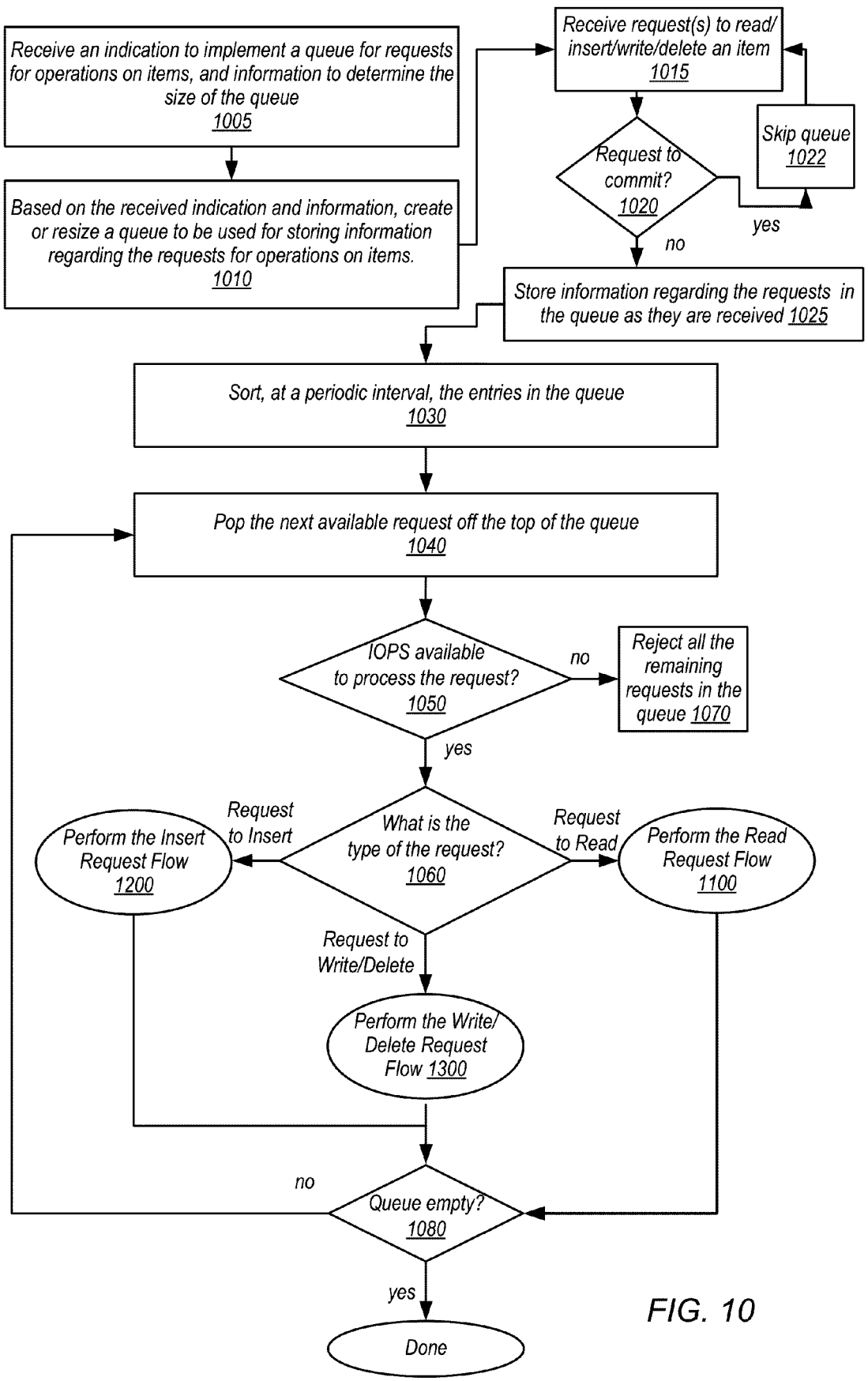
FIG. 10 is a high-level flowchart illustrating various methods and techniques to admit for performance ordered requests for read operations, insert operations, and/or write/delete operations at a node of a distributed database.

FIG. 10 is a high-level flowchart illustrating various methods and techniques to admit for performance ordered requests for read operations, insert operations, and/or write/delete operations at a node of a distributed database, according to some embodiments. The flowchart begins at 1005, where a node such as a storage node may receive an indication to implement a data structure, such as a queue, for requests to perform transactions or requests to perform at least parts of transactions, in some embodiments. A storage node might also receive, either with the indication or separately, information that can be used to determine the size of the data structure, according to some embodiments. First, regarding the indication to implement a data structure, this indication can be received from, for example, a transaction coordinator node that coordinates the transactions across a plurality of storage nodes. Else, this indication might be received from a request routing node, or another node in the distributed system, depending on the embodiment. The appropriate node may detect a triggering event to start implementing queues on some or all of the storage nodes. A triggering event might be, for example, an aborted transaction, in some embodiments. The transaction might be aborted because IOPS were not available to process all the requests for operations associated with the transaction at all the appropriate storage nodes, for example. The transaction coordinator node, or other appropriate node of the distributed system, might send this request to implement a data structure to all storage nodes, or only those storage nodes that were involved in the triggering event, such as the aborted transaction, or only those storage nodes which caused the triggering event, depending on the embodiment. For example, the transaction coordinator node might only send the request to implement a data structure to the storage nodes which rejected the request to prepare an operation associated with the transaction. A goal, in some embodiments, might be to minimize the global latency while maximizing throughput. Therefore, data structures might be implemented only on the storage nodes that are needed in order for requests for operations associated with transactions to be accepted instead of rejected, in some embodiments.

In addition to receiving the indication to implement the data structure for requests to perform transactions or requests to perform at least parts of transactions (such as operations associated with transactions), a storage node might also receive, as well, information that can be used to determine the size of the data structure, according to some embodiments. A transaction coordinator node, or other appropriate node of the distributed system, might determine the size of the data structure so that the storage node or nodes provide optimal, or at least better, throughput. This node might then inform the storage node the appropriate size of the data structure, in some embodiments. For example, this node might inform the storage node how many entries the data structure should have, or in some embodiments use, for implementing the storage of requests received within a period of time. The data structure size might be set as high as necessary in order to provide optimal throughput. Depending on the embodiment, some or all of this previously described functionality might be implemented on the individual storage nodes, instead of the transaction coordinator node, for example. Each individual storage node might determine the size of its own data structure once it receives an indication to implement the data structure, in some embodiments. The storage node might use the number of requests for operations that it receives over a given period of time in order to determine the data structure size, for example. In some embodiments, the storage nodes themselves might determine when to implement a data structure, such as a bounded queue, for received requests to perform transactions, or received requests to perform parts of transactions, instead of receiving an indication from another node.

Then, at 1010, a node such as a storage node may create or resize a data structure, such as a queue, or somehow set the number of entries to use in the data structure, for storing information regarding requests to perform transactions or parts of transactions. The storage node can do this, for example, based on the received indication and/or information from the transaction coordinator node, or other appropriate node in the distributed system, depending on the embodiment. In the embodiments where some or all of this previously described functionality might be implemented on the individual storage nodes themselves, the storage nodes might use the results of this functionality to create or resize its own data structure, or somehow set the number of entries to use in the data structure, for storing information regarding requests to perform transactions or parts of transactions.

At 1015, requests are received to read/insert/write/delete an item. Then the flowchart progresses to 1020 which determines whether the request is a request to commit an item, or a request to actually perform the operation associated with the transaction. If the request is a request to commit an item, or a request to actually perform the operation associated with the transaction, then this type of request might not be stored in the data structure at all, and instead might be processed, or at least sent to a request processing module, depending on the embodiment. This type of request might "jump the queue" or "jump the data structure" since capacity-based admission is not needed for these types of requests, in some embodiments. Therefore, the flowchart transitions to 1022, in which the data structure is skipped, and then transitions back to 1015 which waits to receive requests to read, insert, write, and/or delete an item.

If the request is not a request to commit an item, or not a request to actually perform the operation associated with the transaction, then the flowchart transitions from 1020 to 1025 which stores information regarding the requests in a data structure, such as a queue in these embodiments, as they are received. Then the flowchart transitions to 1030 which sorts, at a periodic interval, the entries in the data structure, such as the queue. Then the flowchart transitions to 1040 which retrieves the next item from the sorted data structure, which in these embodiments pops the first available request off the top of the queue. Then the flowchart transitions to 1050 which determines whether there is capacity, such as IOPS, available to process the request. If there is no capacity available, then at 1070, the process rejects all the remaining requests in the queue. The remaining requests in the queue might be rejected one at a time, or as a batch, depending on the embodiment. If there is capacity available, then the flowchart determines, at 1060 what type of request this is. If this is a request to read an item, then flowchart transitions to item 1100 in FIG. 11. If this is a request to insert an item, the flowchart transitions to item 1200 in FIG. 12. If this is a request to write/delete an item, the flowchart transitions to item 1300 in FIG. 13. After one of these other flowcharts are processed, the flowchart transitions to item 1080 which determines whether the data structure, such as the queue, is empty. If the data structure is empty, then the process finishes. If the data structure is not empty, then the process returns to item 1040 which retrieves the next item from the data structure, such as popping the next available request off the top of the queue, in the embodiments with a queue.

Figure 11:
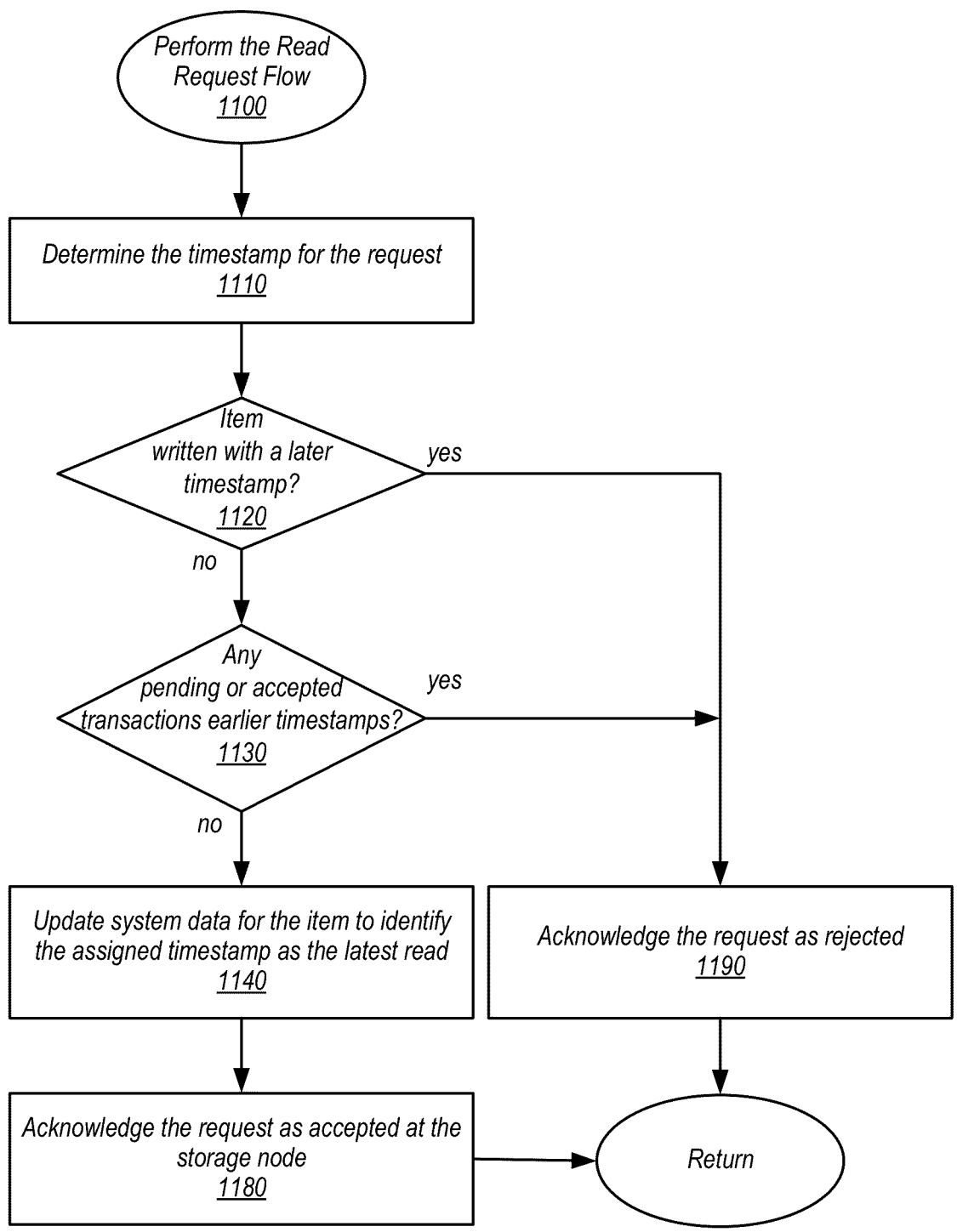
FIG. 11 is a high-level flowchart illustrating various methods and techniques to handle a request to read an item, according to some embodiments.

FIG. 11 is a high-level flowchart illustrating various methods and techniques to handle a request to read an item, according to some embodiments. In some embodiments, read requests may not wait for in-progress transactions, even if they desire strong consistency. A consistency level specified for a read request that is "strongly consistent" may return the result of any previously completed transaction, and may observe the result of a committed in-progress transaction, in some embodiments. A consistency level specified for a read request that is "eventually consistent" may be serviced by reading the current value of an item even if there are pending transactions. Since items may not be written until after a transaction has reached the commit decision, read requests can read the latest value that was written, in some embodiments.

The process begins at 1100 which is a continuation from FIG. 10. As indicated at 1110, a timestamp may be determined for the read request, in some embodiments. For example, timestamps may have been assigned that is later than any completed transactions and earlier than any accepted transactions, in some embodiments. In other embodiments, the timestamp may be based on the clock of the storage node.

As indicated at 1120, if the item was written with a later timestamp than the assigned timestamp (e.g., as described in the system data for the item), then the request to read may be acknowledged as rejected, as indicated at 1190. In some embodiments, as indicated at 1130, if there any pending or accepted transactions with earlier timestamps than the assigned timestamp, then the request to read the item may be rejected as well, as indicated at 1190.

For non-failed writes, system metadata for the item may be updated to identify the assigned timestamp as the latest read, as indicated at 1140, in some embodiments. As indicated at 1180, the request to read may be acknowledged as being accepted. Alternatively, if storage nodes maintained a multi-version store for items, reads with timestamps in the past could be serviced even if later writes have already been performed, in some embodiments. In some embodiments, queries, scans, or batch read requests may not be transactionally consistent.

Figure 12:
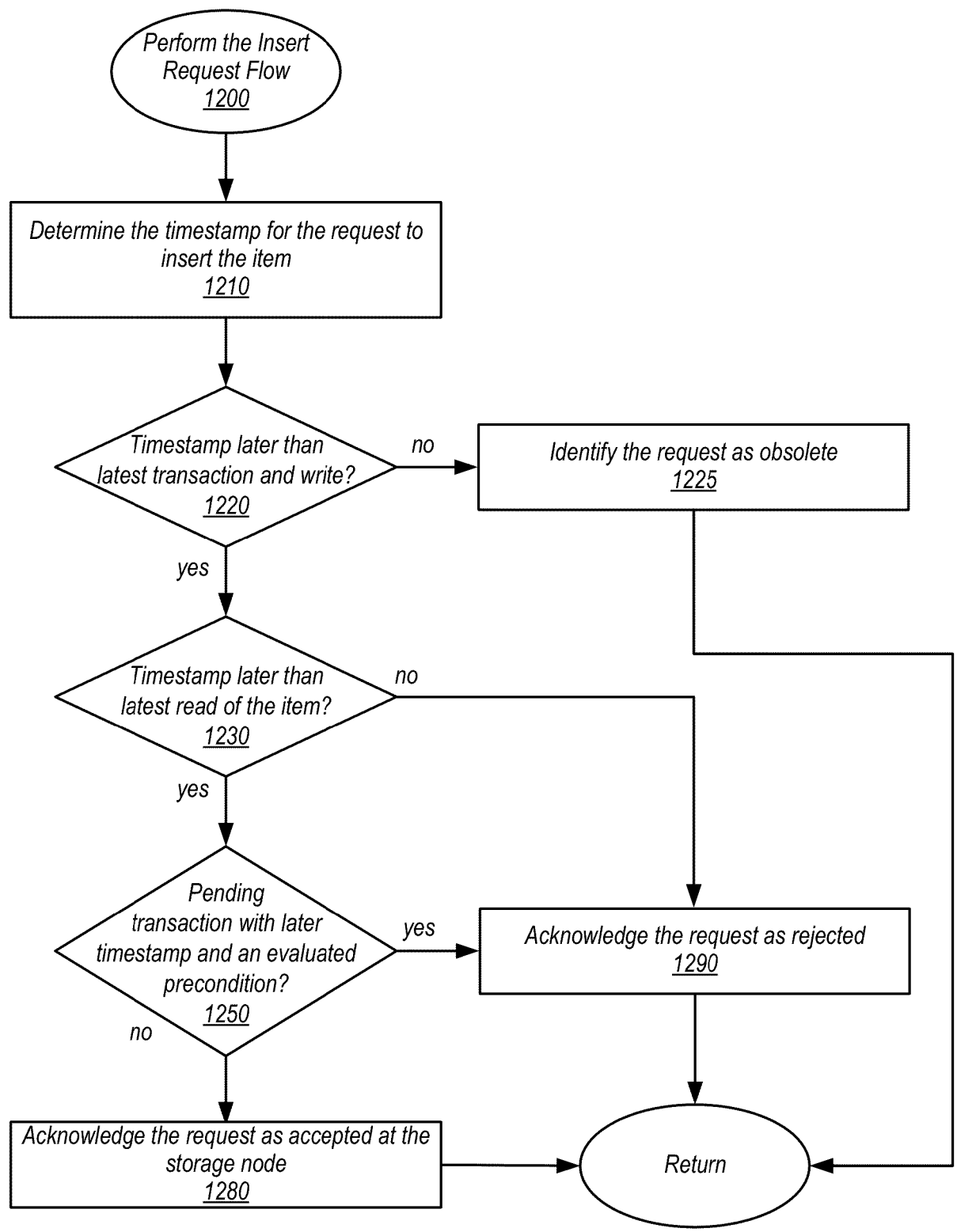
FIG. 12 is a high-level flowchart illustrating various methods and techniques to handle a request to insert an item, according to some embodiments.

FIG. 12 is a high-level flowchart illustrating various methods and techniques to handle a request to insert an item, according to some embodiments. The process begins at 1200 which is a continuation from FIG. 10, in some embodiments. The timestamp of the request may be determined, as indicated at 1210, in some embodiments. As indicated at 1220, if the assigned timestamp is not later than the latest transaction and write to the item's respective timestamps, the request may be identified as obsolete, as indicated at 1225 in some embodiments.

As indicated at 1230, a determination may be made as to whether the determined timestamp for the request is later than the latest read of the item, if not, then the request may be acknowledged as being rejected, as indicated at 1290, in some embodiments. As indicated at 1250, a determination may be made as to whether a transaction is pending with a later timestamp and an evaluated precondition. If so, then as indicated at 1290, the request may be acknowledged as being rejected. If not, then as indicated at 1280, the request to insert the item may be accepted at the storage node, and acknowledged as being so, in some embodiments.

Consider again the examples discussed above with regard to Tx1 and Tx2. Requests to update or write items may not be assigned a timestamp that is later than Tx2 without waiting for Tx2 to complete, in some embodiments. So a request to update or write an item may be rejected if Tx2 has a precondition that prevents the request from jumping ahead in the serialization order, in some embodiments. In various embodiments, requests to delete items may be handled in a similar manner, except that the item may not be deleted immediately. The timestamp system attribute may be retained for some period of time as a tombstone, in some embodiments.

Figure 13:
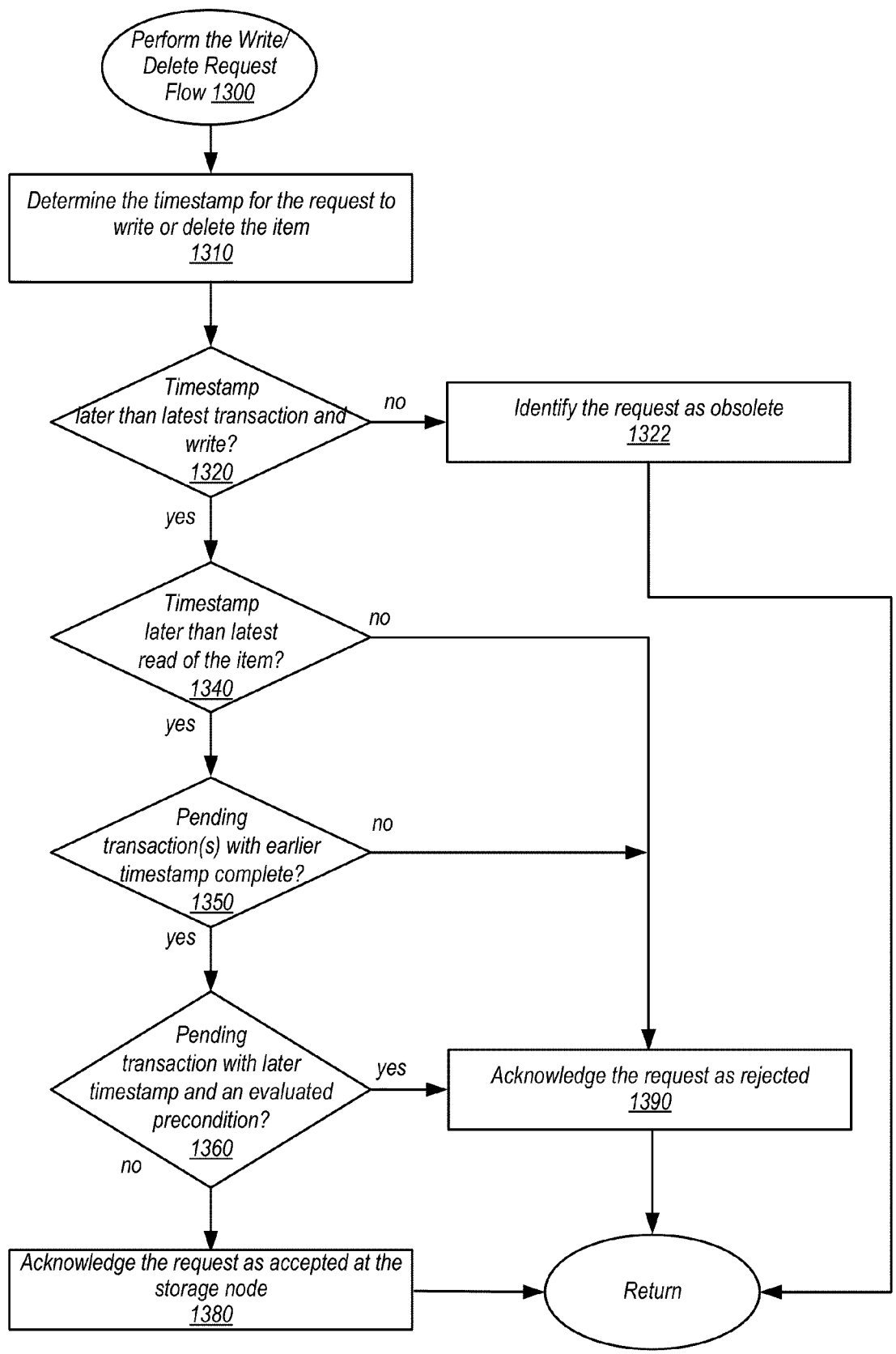
FIG. 13 is a high-level flowchart illustrating various methods and techniques to handle a request to write or delete an item, according to some embodiments.

FIG. 13 is a high-level flowchart illustrating various methods and techniques to handle a request to write or delete an item, according to some embodiments. The process begins at 1300 which is a continuation from FIG. 10, in some embodiments. A timestamp for the request may be determined, as indicated at 1310, in some embodiments. As indicated at 1320, if the assigned timestamp is not later than the latest transaction and write to the item's respective timestamps, the request may be identified as obsolete, as indicated at 1322 in some embodiments.

As indicated at 1340, a determination may be made as to whether the assigned timestamp for the request is later than the latest read of the item, if not, then the request may be acknowledged as being rejected, as indicated at 1390, in some embodiments. As indicated at 1350, a determination may be made as to whether a transaction is pending with an earlier timestamp is complete. If so, then as indicated at 1390, the request may be rejected. As indicated at 1360, a determination may be made as to whether a transaction is pending with a later timestamp and an evaluated precondition. If so, then as indicated at 1390, the request may be determined as being rejected. If not, then as indicated at 1380, the request to write or delete the item may be accepted for performance, and acknowledged as being so accepted, in some embodiments.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 14:
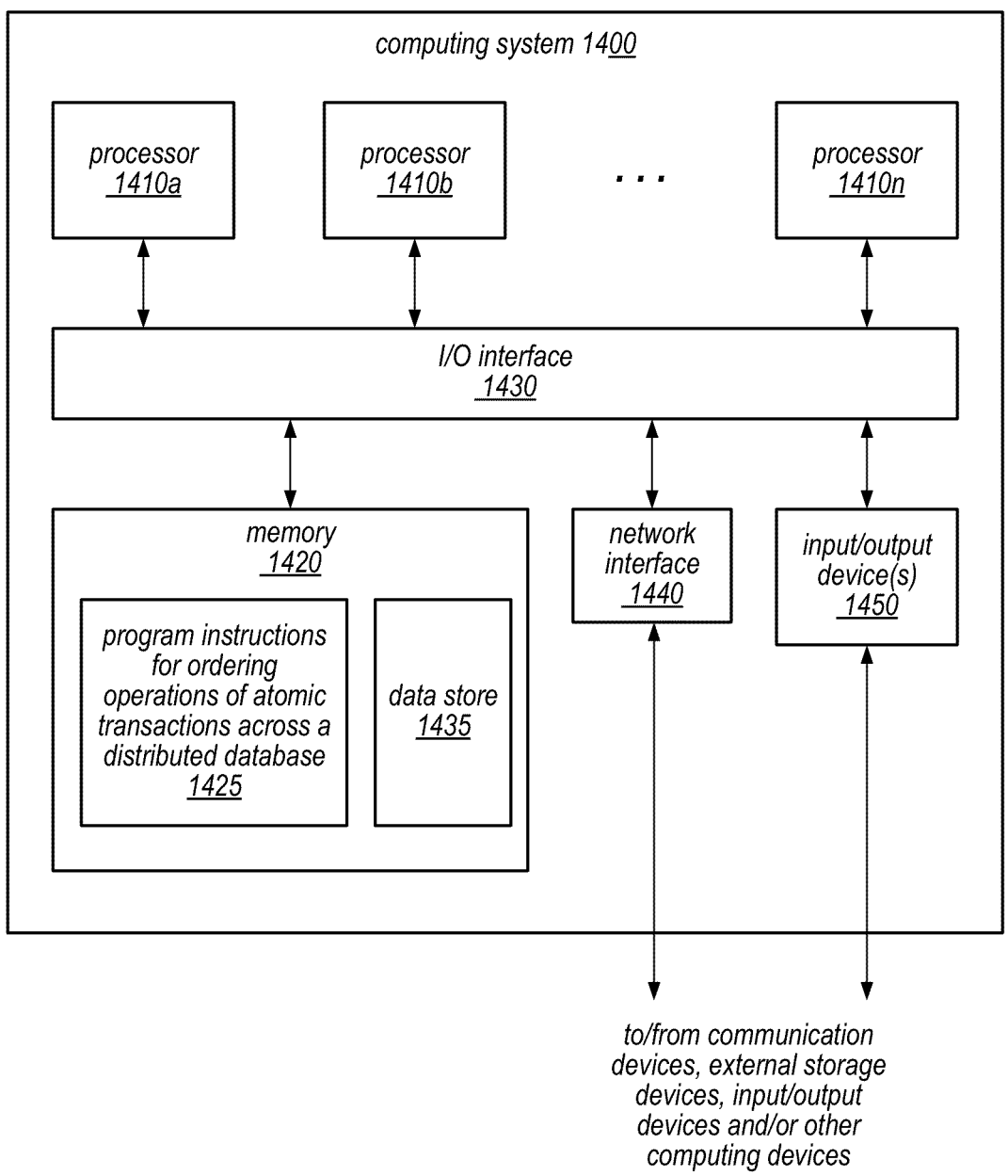
FIG. 14 is a block diagram illustrating an example computing system, according to some embodiments.

Embodiments to implement admitting for performance ordered operations of atomic transactions across a distributed database as described herein may be executed on one or more computer systems, which may interact with various other devices. One such computer system is illustrated by FIG. 14. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1400, while in other embodiments multiple such systems, or multiple nodes making up computer system 1400, may host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions, in one embodiment. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

In some embodiments, at least one processor 1410 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1420 may store program instructions for ordering operations of atomic transactions across a distributed database 1425 and/or data accessible by processor 1410, in one embodiment. In various embodiments, system memory 1420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1420 as program instructions for ordering operations of atomic transactions across a distributed database 1425 and data storage 1435, respectively. In other embodiments, program instructions and/or data may be received, sent or stored upon different types of computer-accessible media or on similar media separate from system memory 1420 or computer system 1400. A computer-accessible medium may include non-transitory storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440, in one embodiment.

In one embodiment, I/O interface 1430 may be coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1410.

Network interface 1440 may allow data to be exchanged between computer system 1400 and other devices attached to a network, such as other computer systems, or between nodes of computer system 1400, in one embodiment. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or retrieving data by one or more computer system 1400, in one embodiment. Multiple input/output devices 1450 may be present in computer system 1400 or may be distributed on various nodes of computer system 1400, in one embodiment. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions for ordering operations of atomic transactions across a distributed database 1425, that implement the various embodiments of the systems as described herein, and data store 1435, comprising various data accessible by program instructions 1425, in one embodiment. In one embodiment, program instructions for ordering operations of atomic transactions across a distributed database 1425 may include software elements of embodiments as described herein and as illustrated in the Figures. Data storage 1435 may include data that may be used in embodiments. In other embodiments, other or different software elements and data may be included.

Those skilled in the art will appreciate that computer system 1400 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1400 may be transmitted to computer system 1400 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor to implement a storage node for a distributed database, the storage node configured to:
        receive, by the storage node, a first request of a plurality of requests to perform a first transaction at a distributed database from a transaction coordinator node that coordinates the transactions across a plurality of storage nodes, wherein the first request comprises a first transaction timestamp;
        store, by the storage node, at least some information regarding the first request in a bounded queue, wherein the at least some information comprises the first transaction timestamp;
        receive, by the storage node after receiving the first request, a second request of the plurality of requests to perform a second transaction at the distributed database from the transaction coordinator node, wherein the second request comprises a second transaction timestamp that is earlier than the first transaction timestamp;
        store, by the storage node, at least some information regarding the second request in the bounded queue, wherein the at least some information comprises the second transaction timestamp;
        sort, at a periodic interval, the entries in the bounded queue by the transaction timestamp associated with each entry;
        admit one or more of the plurality of requests for execution at the storage node according to an order determined based, at least in part, on the sorted queue position of their associated entries, until a capacity of the storage node to perform the respective request is exceeded, wherein the one or more requests admitted for execution at the storage node comprise the second request; and
        reject, at the storage node, remaining ones of the plurality of requests received within the periodic interval whose associated entries are following a point in the queue at which the capacity of the storage node was exceeded, wherein the remaining ones of the plurality of requests rejected at the storage node comprise the first request that was received before the admitted second request.

2. The system of claim 1, and wherein the first request to perform the first transaction, and the second request to perform the second transaction, are requests sent by the transaction coordinator node to the storage node to prepare the storage node to perform the respective transactions, and wherein the program instructions cause the at least one processor to further perform the method to at least:

send, by storage node, a response to the transaction coordinator node accepting the first request;
    send, by storage node, a response to the transaction coordinator node rejecting the second request; and
    after receipt of responses from the storage node and one or more other storage nodes that acknowledge acceptance of the first transaction for performance, send, by the transaction coordinator node, a request to the storage node to perform the first transaction, wherein the first transaction is performed by the storage node after receipt of the request to perform the first transaction.

3. The system of claim 1, wherein sorting the entries in the bounded queue by the transaction timestamp associated with each entry further comprises sorting the entries such that those entries associated with earlier transaction timestamps are arranged before entries associated with later transaction timestamps.

4. The system of claim 1, wherein the distributed database is a non-relational database service offered by a provider network, wherein the first and second requests to perform the first and second transactions are received via a programmatic interface for the non-relational database service, and wherein the requests to perform the transactions are routed to the transaction coordinator node by a request routing node implemented as part of the database service.

5. A method, comprising:
    receiving, at one node of a plurality of different nodes of a distributed system, a plurality of different requests for operations to be performed as part of respective transactions at two or more of the nodes, wherein the plurality of different requests for operations are received within a period of time;
    admitting, by the one node, one or more of the plurality of different requests for operations received within the period of time for performance at the one node, according to an order for performing the respective transactions at the distributed system, until a capacity of the one node to perform the requests for operations is exceeded; and
    rejecting, by the one node, remaining ones of the plurality of different requests for operations received within the period of time, from a point in the order where the capacity of the one node to perform the requests for operations was exceeded.

6. The method of claim 5, wherein receiving a plurality of different requests for operations to be performed as part of respective transactions further comprises:
    receiving, by the one node, a first request to perform a first operation associated with a first transaction of the distributed system from a transaction coordinator node that coordinates the transactions across the plurality of different nodes, wherein the first request comprises a first transaction timestamp associated with the first transaction;
    receiving, by the one node, at least a second request to perform a second operation associated with a second transaction of the distributed system from the transaction coordinator node, wherein the second request comprises a second transaction timestamp associated with the second transaction that is different than the first transaction timestamp; and
    storing, by the one node, at least some information regarding the first request and the second requests as separate entries in a data structure, wherein the at least some information comprises the respective transaction timestamps.

7. The method of claim 6, wherein the data structure is a bounded queue.

8. The method of claim 6, wherein admitting, by the one node, the one or more of the plurality of different requests for operations received within the period of time for performance at the one node, according to the order for performing the respective transactions at the distributed system, further comprises:

sorting, after the conclusion of the period of time, the entries in the data structure by the respective transaction timestamps associated with each entry;

determining whether to admit the first request to perform the first operation associated with the first transaction, and second request to perform the second operation associated with the second transaction, for performance at the storage node according to an order determined based, at least in part, on the sorted position of their associated entries in the data structure.

9. The method of claim 6, wherein prior to storing, by the one node, the at least some information regarding the first request and the second requests as the separate entries in the data structure, the method further comprises:

receiving, by the one node, an indication to implement the data structure for the received plurality of different requests for operations; or detecting, by the one node, a triggering event for implementation of the data structure for the received plurality of different requests for operations.

10. The method of claim 6, and wherein the first request to perform the first operation associated with the first transaction, and the second request to perform the second operation associated with the second transaction, are requests sent by the transaction coordinator node to the storage node to prepare the storage node to perform the respective operations associated with the respective transactions, and wherein the method further comprises:

sending, by storage node, a response to the transaction coordinator node accepting the first request;

sending, by storage node, a response to the transaction coordinator node rejecting the second request; and after receipt of responses from the storage node, and one or more other storage nodes, that acknowledge acceptance of the respective requests for operations associated with the first transaction, sending, by the transaction coordinator node, a request to the storage node to perform the first operation associated with the first transaction, wherein the first operation is performed by the storage node after receipt of the request to perform the first operation associated with the first transaction.

11. The method of claim 5, wherein the distributed system is a non-relational database service offered by a provider network, wherein the plurality of different requests for operations to be performed as part of respective transactions at two or more of the nodes are received at the one node from a transaction coordinator node via a programmatic interface for the non-relational database service, and wherein requests to perform the respective transactions are routed to the transaction coordinator node by a request routing node implemented as part of the database service.

12. The method of claim 5, wherein admitting, by the one node, the one or more of the plurality of different requests for operations received within the period of time for performance at the one node, according to the order for performing the respective transactions at the distributed system, until a capacity of the one node to perform the requests for operations is exceeded, further comprises:

comparing the operations per second needed to perform each of the different requests for operations received within the period of time to the remaining operations per second capacity of the one node, according to the order for performing the respective different transactions associated with the operations of the different requests, at the distributed system;

admitting, by the one node, those requests for operations whose operations per second needed to performance are less than the remaining operations per second capacity of the one node.

13. One or more non-transitory computer-readable storage media storing program instructions that when executed on or across one or more processors of one node of a plurality of different nodes of a distributed system, cause the one or more processors to:

receive, at the one node of the plurality of different nodes of the distributed system, a plurality of different requests for operations to be performed as part of respective transactions at two or more of the plurality of different nodes, wherein the plurality of different requests for operations are received within a period of time;

admit, by the one node, one or more of the plurality of different requests for operations received within the period of time for performance at the one node, according to an order for performing the respective transactions at the distributed system, until a capacity of the one node to perform the requests for operations is exceeded; and reject, by the one node, remaining ones of the plurality of different requests for operations received within the period of time, from a point in the order where the capacity of the one node to perform the requests for operations was exceeded.

14. The one or more non-transitory computer-readable storage media of claim 13, wherein to receive a plurality of different requests for operations to be performed as part of respective transactions further causes the one or more processors to:

receive, by the one node, a first request to perform a first operation associated with a first transaction of the distributed system from a transaction coordinator node that coordinates the transactions across the plurality of different nodes, wherein the first request comprises a first transaction timestamp associated with the first transaction;

receive, by the one node, at least a second request to perform a second operation associated with a second transaction of the distributed system from the transaction coordinator node, wherein the second request comprises a second transaction timestamp associated with the second transaction that is different than the first transaction timestamp; and store, by the one node, at least some information regarding the first request and the second requests as separate entries in a data structure, wherein the at least some information comprises the respective transaction timestamps.

15. The one or more non-transitory computer-readable storage media of claim 14, wherein the data structure is a bounded queue.

16. The one or more non-transitory computer-readable storage media of claim 14, wherein to admit, by the one node, the one or more of the plurality of different requests for operations received within the period of time for performance at the one node, according to the order for performing the respective transactions at the distributed system, further causes the one or more processors to:

sort, after the conclusion of the period of time, the entries in the data structure by the respective transaction timestamps associated with each entry;

determine whether to admit the first request to perform the first operation associated with the first transaction, and second request to perform the second operation associated with the second transaction, for performance at the storage node according to an order determined based, at least in part, on the sorted position of their associated entries in the data structure.

17. The one or more non-transitory computer-readable storage media of claim 14, wherein prior to storing, by the one node, the at least some information regarding the first request and the second requests as the separate entries in the data structure, the program instructions further cause the one or more processors to:
- receive, by the one node, an indication to implement the data structure for the received plurality of different requests for operations; or
- detect, by the one node, a triggering event for implementation of the data structure for the received plurality of different requests for operations.

18. The one or more non-transitory computer-readable storage media of claim 14, wherein the first request to perform the first operation associated with the first transaction, and the second request to perform the second operation associated with the second transaction, are requests sent by the transaction coordinator node to the storage node to prepare the storage node to perform the respective operations associated with the respective transactions, and wherein the program instructions further cause the one or more processors to:
- send, by storage node, a response to the transaction coordinator node accepting the first request;
- send, by storage node, a response to the transaction coordinator node rejecting the second request; and
- after receipt of responses from the storage node, and one or more other storage nodes, that acknowledge acceptance of the respective requests for operations associated with the first transaction, send, by the transaction coordinator node, a request to the storage node to perform the first operation associated with the first transaction, wherein the first operation is performed by the storage node after receipt of the request to perform the first operation associated with the first transaction.

19. The one or more non-transitory computer-readable storage media of claim 13, wherein the distributed system is a non-relational database service offered by a provider network, wherein the plurality of different requests for operations to be performed as part of respective transactions at two or more of the nodes are received at the one node from a transaction coordinator node via a programmatic interface for the non-relational database service, and wherein requests to perform the respective transactions are routed to the transaction coordinator node by a request routing node implemented as part of the database service.

20. The one or more non-transitory computer-readable storage media of claim 13, wherein to admit, by the one node, the one or more of the plurality of different requests for operations received within the period of time for performance at the one node, according to the order for performing the respective transactions at the distributed system, until a capacity of the one node to perform the requests for operations is exceeded, further causes the one or more processors to:
- compare the operations per second needed to perform each of the different requests for operations received within the period of time to the remaining operations per second capacity of the one node, according to the order for performing the respective different transactions associated with the operations of the different requests, at the distributed system;
- admit, by the one node, those requests for operations whose operations per second needed to performance are less than the remaining operations per second capacity of the one node.

* * * * *